(12) United States Patent
Moon et al.

(10) Patent No.: US 6,643,272 B1
(45) Date of Patent: Nov. 4, 2003

(54) POWER LEVEL ARBITRATION BETWEEN BASE STATION AND MOBILE STATION IN MOBILE COMMUNICATION SYSTEM

(75) Inventors: Hi-Chin Moon, Seoul (KR); Jin-Woo Choi, Songnam-shi (KR); Jae-Min Ahn, Seoul (KR); Young-Jun Hwang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/299,167

(22) Filed: Apr. 26, 1999

(30) Foreign Application Priority Data

Apr. 25, 1998 (KR) ............................................. 98-14880

(51) Int. Cl.⁷ ........................... G08C 17/00; H04B 7/00
(52) U.S. Cl. .................. 370/311; 370/318; 370/320; 455/69; 455/70; 455/522
(58) Field of Search ................... 455/69, 70, 522, 455/63, 67.3; 370/311, 318, 320, 335, 342, 331

(56) References Cited

U.S. PATENT DOCUMENTS

| | | | | |
|---|---|---|---|---|
| 5,146,610 A | * | 9/1992 | Longshore et al. ......... 455/218 |
| 5,345,598 A | * | 9/1994 | Dent ..................... 455/522 |
| 5,392,287 A | * | 2/1995 | Tiedemann et al. ........ 370/311 |
| 5,487,180 A | * | 1/1996 | Ohtake .................. 455/522 |
| 5,524,274 A | * | 6/1996 | Takahashi et al. ........ 455/516 |
| 5,590,133 A | * | 12/1996 | Billstrom et al. ......... 370/332 |
| 5,708,656 A | * | 1/1998 | Noneman et al. .......... 370/335 |
| 5,946,356 A | * | 8/1999 | Felix et al. ............. 370/311 |
| 5,991,329 A | * | 11/1999 | Lomp et al. ............. 375/130 |
| 6,009,325 A | * | 12/1999 | Retzer et al. ............ 455/434 |
| 6,101,179 A | * | 8/2000 | Soliman .................. 370/342 |
| 6,137,789 A | * | 10/2000 | Honkasalo ................ 370/342 |
| 6,148,208 A | * | 11/2000 | Love .................... 370/332 |
| 6,166,622 A | * | 12/2000 | Hosur et al. ............ 340/316 |
| 6,169,884 B1 | * | 1/2001 | Funk .................... 455/67.1 |
| 6,286,122 B1 | * | 9/2001 | Alanara ................. 370/329 |
| 6,337,987 B1 | * | 1/2002 | Agin et al. ............. 370/318 |
| 6,370,392 B1 | * | 4/2002 | Li et al. ............... 455/522 |
| 6,473,419 B1 | * | 10/2002 | Gray et al. ............. 370/349 |
| 2002/0086692 A1 | * | 7/2002 | Chheda et al. |

FOREIGN PATENT DOCUMENTS

| | | | |
|---|---|---|---|
| EP | 1 089 456 A2 * | 4/2001 | .......... H04B/7/005 |
| JP | 9-933209 | 1/1997 | |
| JP | 9-139708 | 5/1997 | |
| JP | 9-284205 | 10/1997 | |
| WO | Wo 98/36508 A1 * | 8/1998 | |
| WO | WO 00/70786 A1 * | 11/2000 | .......... H04B/7/155 |

* cited by examiner

*Primary Examiner*—Charles Appiah
(74) *Attorney, Agent, or Firm*—Dilworth & Barrese, LLP

(57) ABSTRACT

A mobile communication system controls transmission power of radio links between a base station and a mobile station. The mobile communication system comprises (a) assigning forward and reverse dedicated control channels to the base station and the mobile station, respectively, and controlling transmission power of the forward and reverse dedicated control channels so that the respective channels can receive data; (b) discontinuing the transmission power control, when data to transmit/receive is not generated for a predetermined time; and (c) for power level arbitration, re-controlling the transmission power of the forward and reverse dedicated control channels in a state where the transmission power control is not performed, so as to adjust the transmission power with which the data can be received.

20 Claims, 20 Drawing Sheets

$T_0$: RESYNC START TIME
$T_1$: TIME REQUIRED WHEN MS ACQUIRES PCB FROM BS
$T_2$: TIME REQUIRED WHEN MS ACQUIRES PCB FROM MS $T_0$: RESYNC START TIME
$T_1$: TIME REQUIRED WHEN MS ACQUIRES PCB FROM BS
$T_2$: TIME REQUIRED WHEN BS ACQUIRES PCB FROM MS $T_0$: RESYNC START TIME
$T_1$: TIME REQUIRED WHEN MS ACQUIRES PCB FROM BS
$T_2$: TIME REQUIRED WHEN BS ACQUIRES PCB FROM MS $T_0$: RESYNC START TIME
$T_1$: TIME REQUIRED WHEN MS ACQUIRES PCB FROM BS
$T_2$: TIME REQUIRED WHEN BS ACQUIRES PCB FROM MS $T_0$: RESYNC START TIME
$T_1$: TIME REQUIRED WHEN MS ACQUIRES PCB FROM BS
$T_2$: TIME REQUIRED WHEN MS ACQUIRES PCB FROM BS

POWER LEVEL ARBITRATION BETWEEN BASE STATION AND MOBILE STATION IN MOBILE COMMUNICATION SYSTEM

CLAIM OF PRIORITY

This application makes reference to, incorporates the same herein, and claims all benefits accruing under 35 U.S.C. §119 from an application entitled STATE TRANSITION METHOD IN MOBILE COMMUNICATION SYSTEM earlier filed in the Korean Industrial Property Office on Apr. 25, 1998, and there duly assigned Ser. No. 98-14880.

BACKGROUND OF THE INVENTION

1. Field of the Invention

The present invention relates generally to a mobile communication system, and in particular, to a method for arbitrating a power level between a base station and a mobile station in a CDMA mobile communication system.

2. Description of the Related Art

An existing code division multiple access (CDMA) mobile communication system mainly supports voice service. It is, however, foreseeable that mobile communications will be performed in accordance with the IMT-2000 (International Mobile Telecommunication-2000) standard in the near future. The IMT 2000 standard provides not only voice service but also high speed packet service. For example, the IMT-2000 standard supports high quality voice service, moving picture service, Internet search service, etc.

In the existing CDMA mobile communication system, after completion of data transmission, a channel used for data transmission is released. Thereafter, when there is a need to restart data transmission, the channel is reconnected in response to a channel request message to transmit the data. However, due to the channel reconnection, the existing system has an increased time delay in providing the packet service as well as the voice service, so that it is difficult to provide a high quality service. Therefore, there is a demand for an improved method capable of providing the packet service with reduced time delay. If there is a discontinuous transmission (DTX) data channel, a burst data is transmitted intermittently. In the packet data service, after transmission of the burst data, there is a non-transmission interval before transmission of the next burst data. In the non-transmission interval, the existing system releases or maintains the channel; releasing the channel causes a time delay in reconnecting the channel and maintaining the channel results in a waste of channel resources and an increase of undesired interference to other channels.

SUMMARY OF THE INVENTION

It is, therefore, an object of the present invention to provide a power control method for transitioning from a state where data is not transmitted to a state where data can be immediately transmitted, in a mobile communication system.

It is another object of the present invention to provide a method for transitioning from a slotted substate to a normal substate where a transition to an active state can be readily made.

It is further object of the present invention to provide a method for efficiently controlling the transmission power of a base station and a mobile station in a mobile communication system.

The present invention is directed specifically to the case of slotted substate. However, the invention has general application to all DTX channels in a CDMA mobile communication system including the IMT-2000 system. For example, where the DTX channel is a DCCH (dedicated control channel) and a SCH (supplemental channel). The DCCH is used in a control hold state and an active state (data transmission state) and SCH is used only in an active state. Both channels can transmit messages discontinuously. In the cases of a DTX channel that has no data to transmit, a power control signal is transmitted. However, the time between message transmissions may be long. Moreover, the process of (channel releases has an associated time delay and continuous transmissions can increase interference). Therefore the present invention has applicability to the entire DTX channel including DCCH and SCH, which maintain a period of non-transmission with no power control.

To achieve the above objects, a mobile communication system according to the present invention controls the transmission power of radio links between a base station and a mobile station. The method of the present invention includes (1) assigning forward and reverse dedicated control channels to the base station and the mobile station, respectively, and controlling transmission power of the forward and reverse dedicated control channels so that the respective channels can receive data; (2) discontinuing the transmission power control, when data to be transmitted is not generated for a predetermined time; and (3) performing power level arbitration which involves re-controlling the transmission power of the forward and reverse DTX channels in a state where the transmission power control has been discontinued (see step 2), to adjust the transmission power so that the respective channels can transmit/receive data again.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF THE PREFERRED EMBODIMENT

Figure 1:
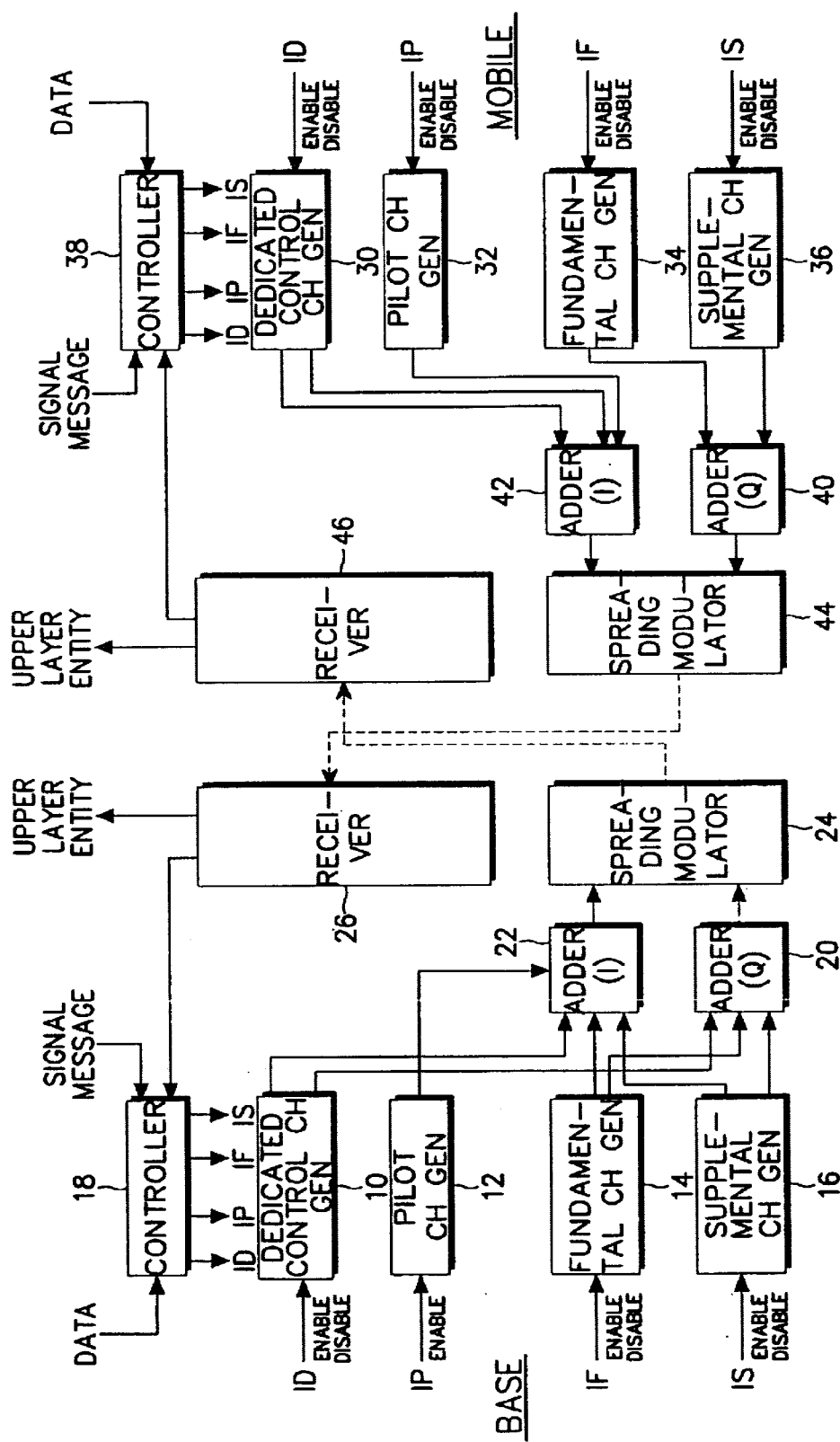
FIG. 1 is a block diagram illustrating channel structures of a base station and a mobile station according to an embodiment of the present invention.

A preferred embodiment of the present invention will be described hereinbelow with reference to the accompanying drawings. In the following description, well known functions or constructions are not described in detail since they would obscure the invention in unnecessary detail.

The term "power level arbitration" (or transmission power level reestablishment) as used herein can be defined as follows. If power control is not performed for a long time, the base station and the mobile station cannot establish an appropriate transmission power level when it is necessary to restart data transmission. Thus, the communication system adjusts the transmission power of the base station and the mobile station to an appropriate transmission power through a power adjustment process. This transmission power adjustment process is referred to herein as "power level arbitration". For example, power level arbitration is applicable to message transmission over a dedicated control channel in a CDMA mobile communication system. Further, the term "appropriate transmission power" refers to a transmission power level which enables normal message reception at a receiver.

Korean patent application No. 11381/1998, filed by the applicant of the invention, discloses a channel structure in which a base station (BS) and a mobile station (MS) have their own dedicated control channels. During data communication through a traffic channel, the base station and the mobile station exchange control signals for the traffic channel using the dedicated traffic channels. However, when the data communication is inactivate for a long period, a state transition occurs to a control hold state where the traffic channel is released and only the dedicated control channel is maintained, thereby preventing a waste of channel traffic channel resources. Further, when data to be transmitted is generated in this control hold state, the traffic channel is promptly reconnected. Such a control hold state is divided into two substates; a normal substate and a slotted substate. In the normal substate, there is no data to be transmitted, and only the control signals are exchanged via the dedicated control channel. If data to be transmitted is not generated within a predetermined time, a transition to the slotted substate takes place. In the slotted substate, the dedicated control channel resources (orthogonal code, service option, PPP etc.) is maintained but the control signals and power control bit are not exchanged via the dedicated control channel in order to prevent power consumption of the mobile station due to the continuous exchange of the signals even though there is no data to transmit in an existed art. Therefore, for a transition from this slotted substate back to the normal substate, power level arbitration is required between the base station and the mobile station.

In the exemplary embodiment, the system will transition to the slotted substate in the case where a normal power control has not been performed for a long time because there is no data to be exchanged between the base station and the mobile station. While in the slotted substate, the transmission power is adjusted to the appropriate transmission, previously defined, power so that a receiving party can normally receive a message transmitted from a transmission party. In this case, a power level arbitration is performed prior to a state transition from the slotted substate to the normal substate.

Also, in this case, the transmission power is controlled such that the receiving party can normally receive the message transmitted from the transmitting party.

Channel Structure After a Call Setup

FIG. 1 illustrates respective channels and channel transceivers which are used between the base station and the mobile station after call setup, in a CDMA mobile communication system according to an embodiment of the present invention. For simplicity, channels used during the call setup are not illustrated in FIG. 1.

In some cases, the functions of the respective channels may be varied. In particular, power control bits (or power control signals) and preamble signals can be transmitted via not only a specific channel but also other channels. However, for convenience, it is assumed that the power control bits and the preamble signals are transmitted via the specific channel.

Referring to FIG. 1, there are shown channel structures for a base station and a mobile station.

First, in the base station, a dedicated control channel generator 10 processes various signaling messages to be transmitted via a forward link dedicated control channel (F-DCCH) and transmits the processed signaling message to the mobile station. A pilot channel generator 12 processes a signal to be transmitted via a forward link pilot channel (F-PCH) and transmits the processed signal to the mobile station. The signal transmitted via the forward link pilot channel assists the mobile station with its initial acquisition and channel estimation. A fundamental channel generator 14 processes information to be transmitted via a forward link fundament channel (F-FCH) and transmits the processed information to the mobile station. The information transmitted via the forward link fundamental channel basically includes a voice signal, but can also include various layer 3 signaling messages and power control bits which are used in the IS-95B standard. A supplemental channel generator 16 processes information to be transmitted via a forward link supplemental channel (F-SCH) and transmits the processed information to the mobile station. The information transmitted via the forward link supplemental channel includes RLP (Radio Link Protocol) frames and packet data.

Next, in the mobile station, a dedicated control channel generator 30 processes signaling messages to be transmitted via a reverse link dedicated control channel (R-DCCH) and transmits the processed signaling message to the base station. A pilot channel generator 32 processes signal to be transmitted via a reverse link pilot channel (R-PCH) and transmits the processed signal to the base station. The signal transmitted via the reverse link pilot channel assists the base station with its initial acquisition and channel estimation. Also, a reverse pilot channel signal can carry the power control bits to provide the base station with power control information about the forward channels. Further, in the reverse link, it is possible to transmit the power control bits by inserting them in the pilot channel, without assignment of a separate channel. A fundamental channel generator 34 processes information to be transmitted via a reverse link fundamental channel (R-FCH) and transmits the processed information to the base station. The information transmitted via the reverse link fundamental channel basically includes a voice signal. A supplemental channel generator 36 processes information to be transmitted via a reverse link supplemental channel (R-SCH) and transmits the processed information to the base station. The information transmitted via the reverse link supplemental channel includes RLP frames and packet data.

In the CDMA mobile communication system of FIG. 1, for a packet data communication service, the base station uses the pilot channel, the dedicated control channel and the supplemental channel for the forward link, and the mobile station uses the pilot channel, the dedicated control channel and the supplemental channel for the reverse link. In this case, the base station transmits the power control bits via the forward dedicated control channel and the mobile station transmits the power control bits by inserting them in the reverse pilot channel. In addition, a controller 18, adders 20 and 22, a spreading modulator 24 and a receiver 26 for the base station, and a controller 38, adders 40 and 42, a spreading modulator 44 and a receiver 46 for the mobile station are well described in Korean patent application 11381/1998, filed by the applicant of the invention.

Channel State Transitions

Figure 2:
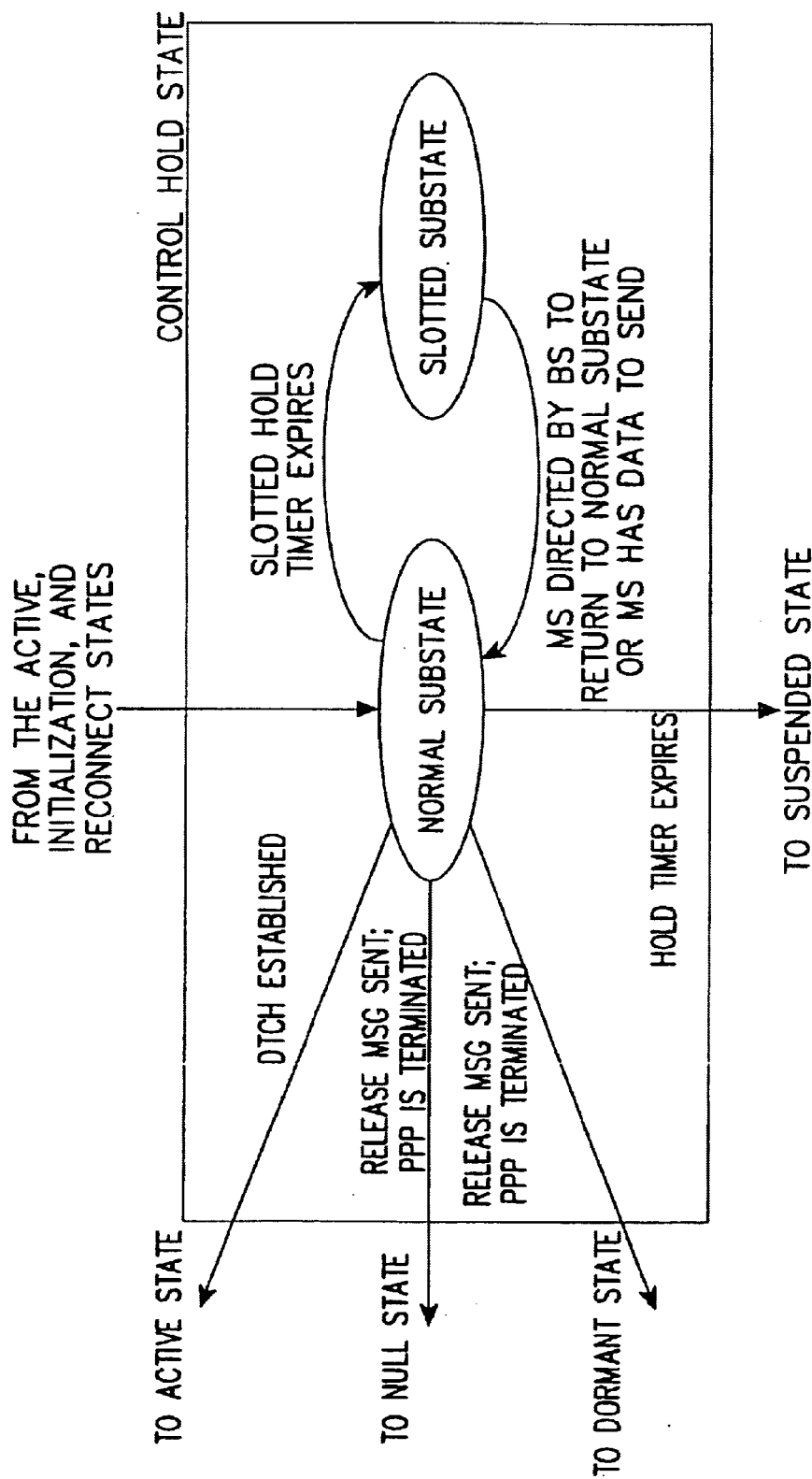
FIG. 2 is a diagram illustrating state transitions in a mobile communication system according to an embodiment of the present invention.

FIG. 2 illustrates state transitions of the base station and the mobile station. Since the present invention relates chiefly to the power control in the control hold state, the descriptions will now be made focusing on the control hold state.

Referring to FIG. 2, in the control hold state, a traffic channel for the packet data is released because there is no actual data to transmit, and a dedicated control channel is maintained to exchange the control signals normally exchanged on the traffic channel. As illustrated, the control hold state is divided into two substates, a normal substate and a slotted substate. In the normal substate, the control signals are exchanged via the dedicated control channel when there is a control signal to transmit. If there is no control message to transmit, only normal power control bits are transmitted to maintain normal power control. When the control message is not generated for a predetermined period, the control hold normal substate transactions to the control hold slotted substate. In the slotted substate, the dedicated control channel resources are maintained, but the control signals and power control but are not exchanged via the dedicated control channel.

Referring to FIGS. 1 and 2, in the control hold state, the base station maintains the pilot channel (in fact forward pilot signal always is transmitted) and the dedicated control channel for the forward link, and the mobile station maintains the pilot channel and the dedicated control channel for the reverse link. In the normal substate, the control signals are exchanged via the dedicated control channel. However, in the slotted substate, although the dedicated control channel resources are maintained, the control signals are not transmitted via the dedicated control channel because there is no control signal. If this slotted substate lasts for a while, the channel condition will vary with the passage of time. After a while, if a control message is transmitted with a transmission power established much earlier in time, the receiving party cannot normally restore the received message.

If data to be transmitted is not generated within a predetermined time in the normal substate of the control hold state, a transition to the slotted substate takes place. In the slotted substate, although the dedicated control channel is maintained, the control signals and continuous power control bit are not exchanged, thereby preventing a waste of resources and increasing unnecessary interference. Further appropriate power control is not maintained in the slotted substrate as is done in the normal substrate.

Figure 3:
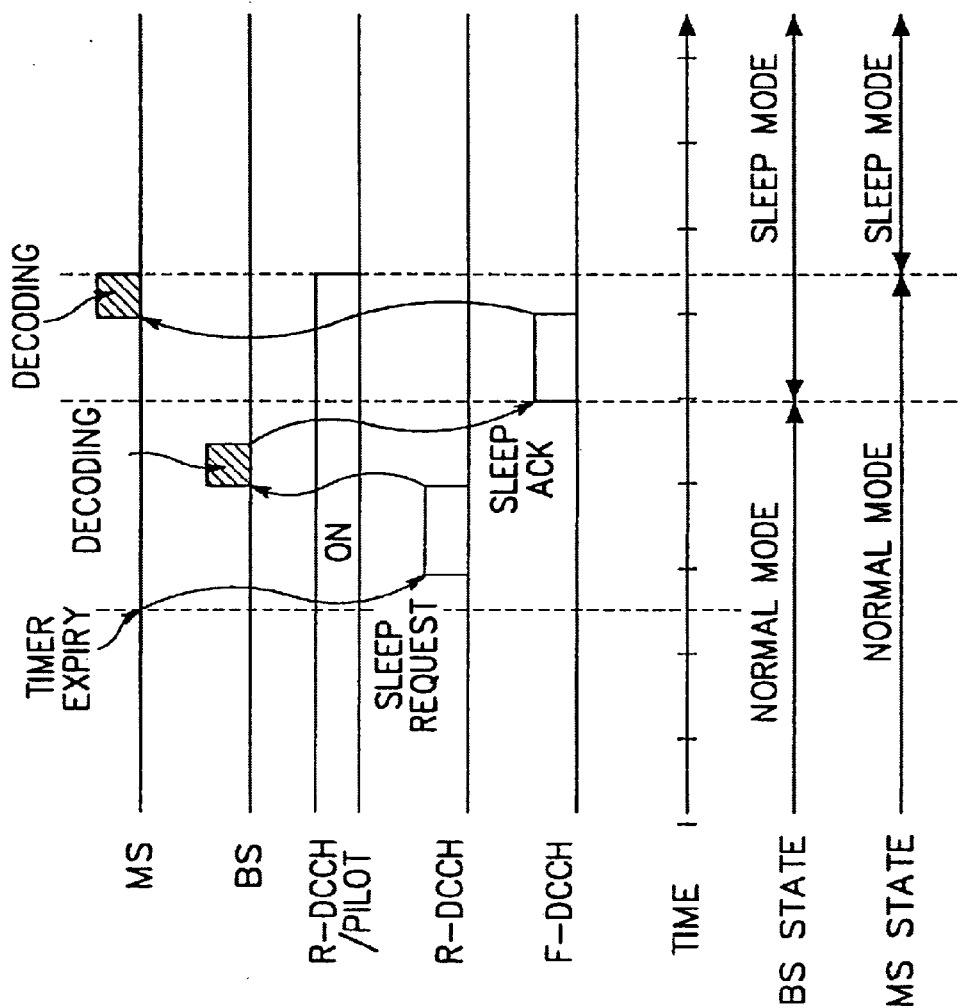
FIG. 3 is a diagram for describing a state transition from a normal substate of a control hold state to a slotted substate.

An exemplary transition from the normal substate to the slotted substate will be described with reference to FIG. 3. In FIG. 3, a "normal mode" denotes an operation in the normal substate and a "sleep mode" an operation in the slotted substate.

Transition From Normal Substate to Slotted Substate

Referring to FIG. 3, when the normal substate is maintained for a predetermined time without transmission of control signals or data (i.e., until a corresponding timer expires), the mobile station transmits a sleep request signal (i.e., a transition-to-slotted substate request signal) to the base station via the reverse dedicated control channel (R-DCCH). In the normal substate, the mobile station uses the dedicated control channel and the pilot channel for the reverse link, and the base station uses the dedicated control channel and the pilot channel for the forward link. In the normal state, since power control is normally performed, power level arbitration is not required. Upon receipt of the sleep request signal from the mobile station, the base station transmits a sleep ACK (or a transition-to-slotted substate approval signal) to the mobile station via the forward dedicated control channel (F-DCCH), and then transitions to the slotted substate. Upon receipt of the sleep ACK signal transmitted from the base station, the mobile station transitions to the slotted substate. Upon transitioning to slotted substate, the base station and the mobile station both maintain the resources of forward and reverse dedicated control channels, respectively, but do not exchange control signals via the forward and reverse dedicated control channels. Therefore, normal power control is not performed.

In some cases, the base station and the mobile station can transition to the slotted substate directly using their own internal timers being out of clock when the control message is not transmitting and receiving, without the above-stated negotiation for state transition.

When the slotted substate is maintained for a predetermined time and when data to be transmitted is generated in the base station or the mobile station, a transition back to the normal substate from the slotted substate occurs in accordance with the method of the present invention, which will be later described with reference to FIGS. 4 through 17.

Transition From Control Hold State to Active State

Referring again to FIG. 2, while in the active state, packet data is exchanged via the traffic channel, while control signals are exchanged via the dedicated control channel. The transition from the control hold state to the active state can occur in two ways: (1) a transition from the normal substate of the control hold state to the active state and (2) a transition from the slotted substate of the control hold state to the active state. Referring initially to the first (1) transition, when data to be transmitted is generated in the normal substate of the control hold state, the base station and the mobile station exchange the control signals via the dedicated control channels to assign the traffic channel for transmitting the packet data. Upon establishment of the traffic channel, a transition occurs to the active state where the packet data can be exchanged via the assigned traffic channel.

Referring now to the second (2) transition, a transition from the slotted substate of the control hold state to the active state takes place by way of the normal substate. Referring to FIG. 1, in the active state, the base station and the mobile station can use the supplemental channels and fundamental channels as well as the pilot channels and the dedicated control channels. In the control hold state, when there is no data to transmit in a predetermined time the control hold state transitions to the suspended state.

In a suspended state, the dedicated control channel is released and a common channel is used. That is, upon failure to make a transition from the slotted substate of the control hold state to the active state within a predetermined time, a transition occurs to a suspended state where the dedicated control channel resource (orthogonal code), which was maintained in the slotted substate, is released and the control signals are transmitted using the common channel. The transition from the slotted substate to the suspended state also occurs through the normal substate of the control hold state for transmitting state transition message. In the suspended state, service information (or service option) between the base station and the mobile station is preserved (or maintained). In the suspended state, when there is no data to transmit in a predetermined time the suspended state transitions to the dormant state.

A dormant state is equal to the suspended state in that the dedicated control channel resource (orthogonal code) is released and the common channel is used. However, in the dormant state, the service option between the base station and the mobile station is no longer preserved. In the dormant state, when there is no data to transmit in a predetermined time the dormant state transitions to the null state.

In a null state, the base station and the mobile station are powered on and wait for data service request to be received from the other party. The null state is a kind of suspended state. In the active state, the control hold state, the suspended state and the dormant state, initialization information (BS system parameters, ESN, etc.) between the base station and the mobile station is maintained. However, in the null state, the initialization information between the base station and the mobile station is not preserved. Upon the transition from the control hold state to the null state, all the information being preserved between the base station and the mobile station is released.

For more detailed description of the respective states and state transitions, see Korean patent application No. 2263/11998 filed by the applicant of the invention.

Transition From Slotted Substate to Normal State Using Power Level Arbitration

The present invention is an improved method for arbitrating the transmission power level for transitioning from the slotted substate of the control hold state to the normal substate. The arbitration will be described in accordance with the following three embodiments:

(I) Overview of the Three Embodiments

In a first embodiment, a power level is arbitrated at a scheduled time between the base station and the mobile station, regardless of whether there is data to transmit (i.e., scheduled power level arbitration).

In a second embodiment, the power level arbitration is performed for a transition from the slotted substate to the normal substate only when data transmission is required (i.e., unscheduled power level arbitration). This embodiment can be divided again into two subcases: (1) a case where the power level arbitration is performed for the transition to the normal substate when the mobile station has data to transmit, and (2) a case where the power level arbitration is performed for the transition to the normal substate when the base station has data to transmit.

A third embodiment is a combination of the first and second embodiments. In this embodiment, during a periodic or non-periodic power level arbitration process being performed at a scheduled time between the base station and the mobile station, if data transmission is required, power level arbitration is immediately performed for a transition from the slotted substate to the normal substate, regardless of the scheduled time.

Figure 4:
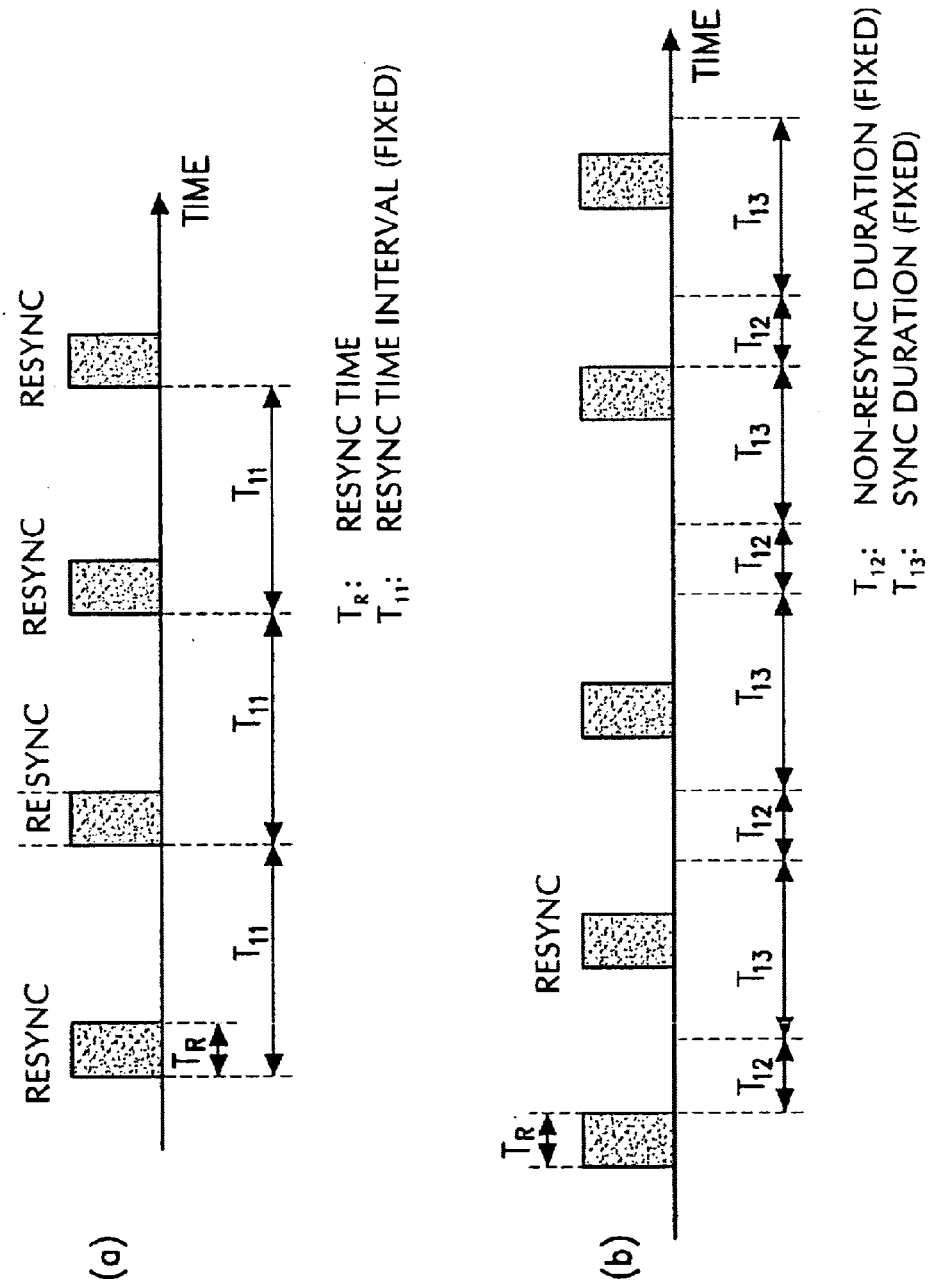
FIGS. 4A and 4B are diagrams for describing power level arbitration performed at a scheduled time (i.e., scheduled power level arbitration) between a base station and a mobile station according to an embodiment of the present invention.
Figure 5:
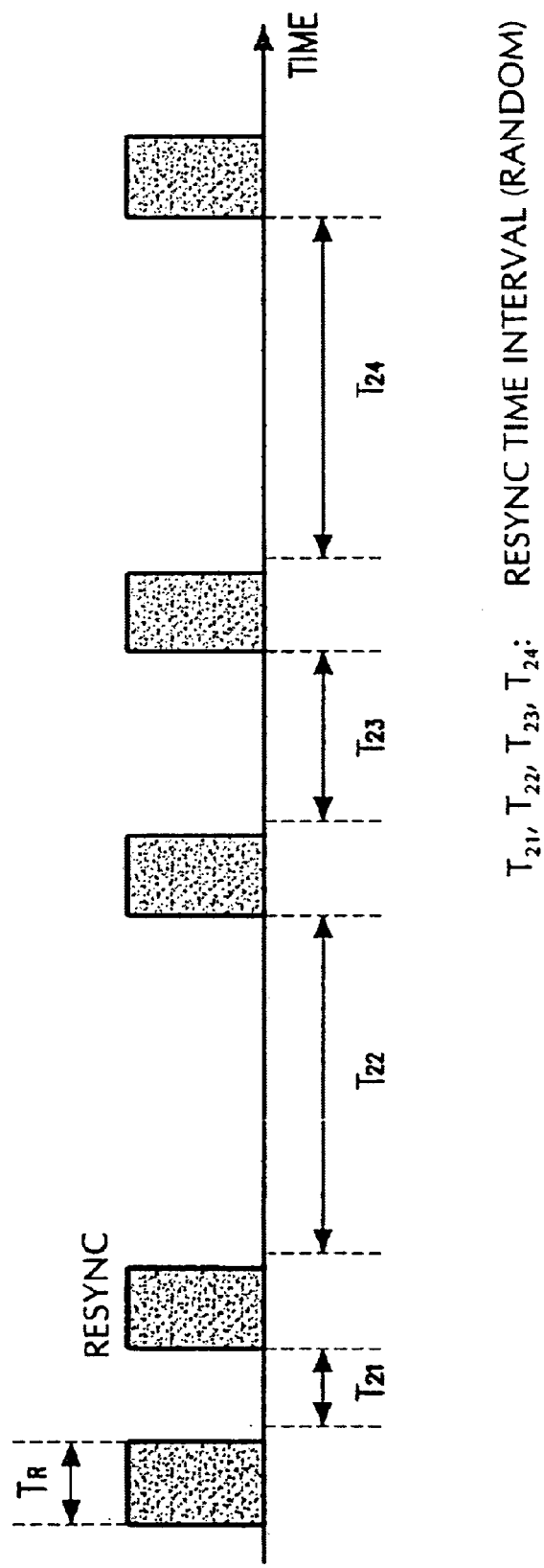
FIG. 5 is a diagram illustrating the case where power level arbitration is performed only when the base station or the mobile station have data to transmit (i.e., unscheduled power level arbitration), according to an embodiment of the present invention.
Figure 6:
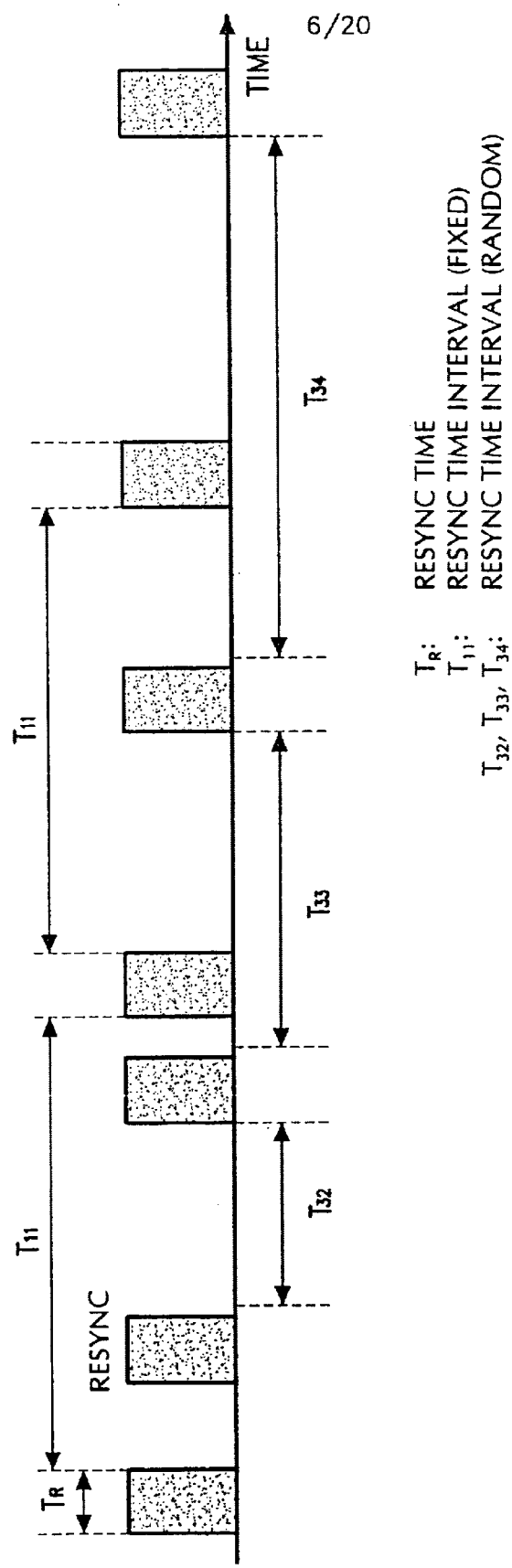
FIG. 6 is a diagram illustrating the case where a power level is arbitrated at every time there is data to transmit, during the scheduled power level arbitration, according to an embodiment of the present invention.

The three embodiments for the power level arbitration (or power level reestablishment) are illustrated in FIGS. 4 (4A and 4B), 5 and 6, respectively. More specifically, FIGS. 4A and 4B illustrate the first embodiment for arbitrating the power level at the scheduled time between the base station and the mobile station. FIG. 5 illustrates the second embodiment for arbitrating the power level for the transition from the slotted substate to the normal substate only when there is data to transmit in the base station or the mobile station. FIG. 6 illustrates the third embodiment where the power level arbitration is immediately performed for the transition from the slotted substate to the normal substate when there is data to transmit, during the scheduled power level arbitration.

The above stated three methods for power level arbitration is performed between the base station and the mobile station via a forward dedicated control channel and a reverse pilot channel using power control bits. The base station receives a mobile station transmitted power control bit, measures the received power level and generates a power control bit to transmit the generated power control but to the mobile station for control of the mobile station transmitting power level. In addition, the mobile station also receives a base station transmitted power control bit, measures the received power level and generates a power control bit to transmit the generated power control bit to the base station for control of the base station transmitting power level. In another embodiment, as shown in FIG. 13A, the mobile station can transmit a preamble (pilot) signal including the power control bit.

First Embodiment

Referring to FIGS. 4A and 4B, there are shown distribution of the power level arbitration in the case where the power level arbitration is performed at a scheduled time between the base station and the mobile station. The base station and the mobile station both having information about the scheduled power level arbitration time. The power level arbitration process is simultaneously performed at every scheduled power level arbitration time. More specifically, FIG. 4A shows the case where the power level arbitration time is set to be periodic and the power level arbitration is performed at each periodic power level arbitration interval. FIG. 4B shows the case where the power level arbitration time is set to be non-periodic and the power level arbitration is performed at each nonperiodic power level arbitration interval, which is known to both the base station and the mobile station. In FIG. 4A, $T_R$ denotes a power level arbitration time, and $T_{11}$ is a fixed power level arbitration time interval. In FIG. 4B, $T_R$ and $T_{13}$ represent fixed non-power and power level arbitration time intervals, and $T_{12}$ represents a fixed time interval, respectively. As illustrated in FIG. 4B, the power level arbitration is performed non-periodically within each $T_{13}$ interval. That is, power level arbitration is performed at a pseudo-random starting point within each $T_{13}$ interval. FIGS. 4A and 4B, upon failure to perform the power level arbitration within the time $T_R$, the power level arbitration is attempted again in the next power level arbitration time interval.

In the case of the scheduled power level arbitration shown in FIGS. 4A and 4B, it is possible to reasonably estimate the round trip delay (RTD) between the base station and the mobile station, based on the previously performed power level arbitration, thereby reducing the size of a search window for receiving signal power control but for power level arbitration. Here, the RTD refers to a required delay time whereby the base station receives a response signal after transmitting a signal to the mobile station. The reduction in the size of the search window reduces the power level arbitration time. However, in the scheduled power level arbitration, when data to be transmitted is generated in the power level arbitration time interval $T_{11}$, it is undesirably necessary to wait until the next power level arbitration time in order to transmit the generated data. In addition, even when no data is generated for transmission, the power level arbitration is automatically performed at every scheduled power level arbitration time, resulting in interference.

Second Embodiment

Referring to FIG. 5, there is shown a distribution of power level arbitration in the case where the power level arbitration is performed only when the base station or the mobile station have data to transmit (i.e., unscheduled power level arbitration). In this case, the base station or the mobile station, which has data to transmit, initiates the power level arbitration. In FIG. 5, $T_{21}$, $T_{22}$, and $T_{23}$ denote non-periodic power level arbitration time intervals which cannot be predicted since the power level arbitration is performed whenever the base station or the mobile station has data to transmit. In FIG. 5, upon failure to perform the power level arbitration within a predetermined time $T_R$, the power level arbitration is attempted again immediately (not illustrated).

In FIG. 5, since the power level arbitration is performed only when it is necessary to transmit data, it is possible to prevent a waste of system resources as was true in the first embodiment. When the power level arbitration is performed after a long quiescent period in the slotted substate, it is impossible to predict the RTD between the base station and the mobile station due to the mobility of the mobile station. As a result, the size of the search window is increased for the received signal which causes an increase in the power level arbitration time.

Third Embodiment

Referring to FIG. 6, there is shown a distribution of power level arbitration for an improved power level arbitration method combining the methods of the previous two embodiments. In the present embodiment, in addition to performing scheduled power level arbitration, power level arbitration is additionally performed any time there is data to transmit, so as to make a prompt state transition to transmit the data. In FIG. 6, (1) upon failure to perform the power level arbitration within the time $T_R$, the power level arbitration is abandoned; (2) when the power level arbitration is periodically performed, the power level arbitration is attempted again upon occurrence of the next power level arbitration; (3) upon failure to perform the power level arbitration within the time $T_R$ when the power level arbitration is attempted to transmit data, the power level arbitration is immediately attempted.

In summary, as previously noted with reference to the first embodiment and FIGS. 4A and 4B, it is possible to predict the RTD while periodically performing power level arbitration, contributing to a decrease in the power level arbitration time. However, when data to be transmit is generated before the start of the power level arbitration interval, it is necessary to wait until the next power level arbitration time in order to transmit the generated data. In FIG. 5, as previously stated, the power level arbitration is performed only when there is data to transmit, preventing increase of interference to other users. However, a long quiescent period in the slotted substate increases the power level arbitration time.

Accordingly, by combining the methods of the first and second embodiments, it is possible not only to quickly perform the power level arbitration by the periodic power level arbitration but also to immediately perform the power level arbitration at any time generated data is to be transmitted, so as to make a prompt transition from the slotted substate to the normal substate to transmit the generated data. In this case the periodic power arbitration period can be reduced from that illustrated in FIG. 5A and FIG. 5B.

Figure 7:
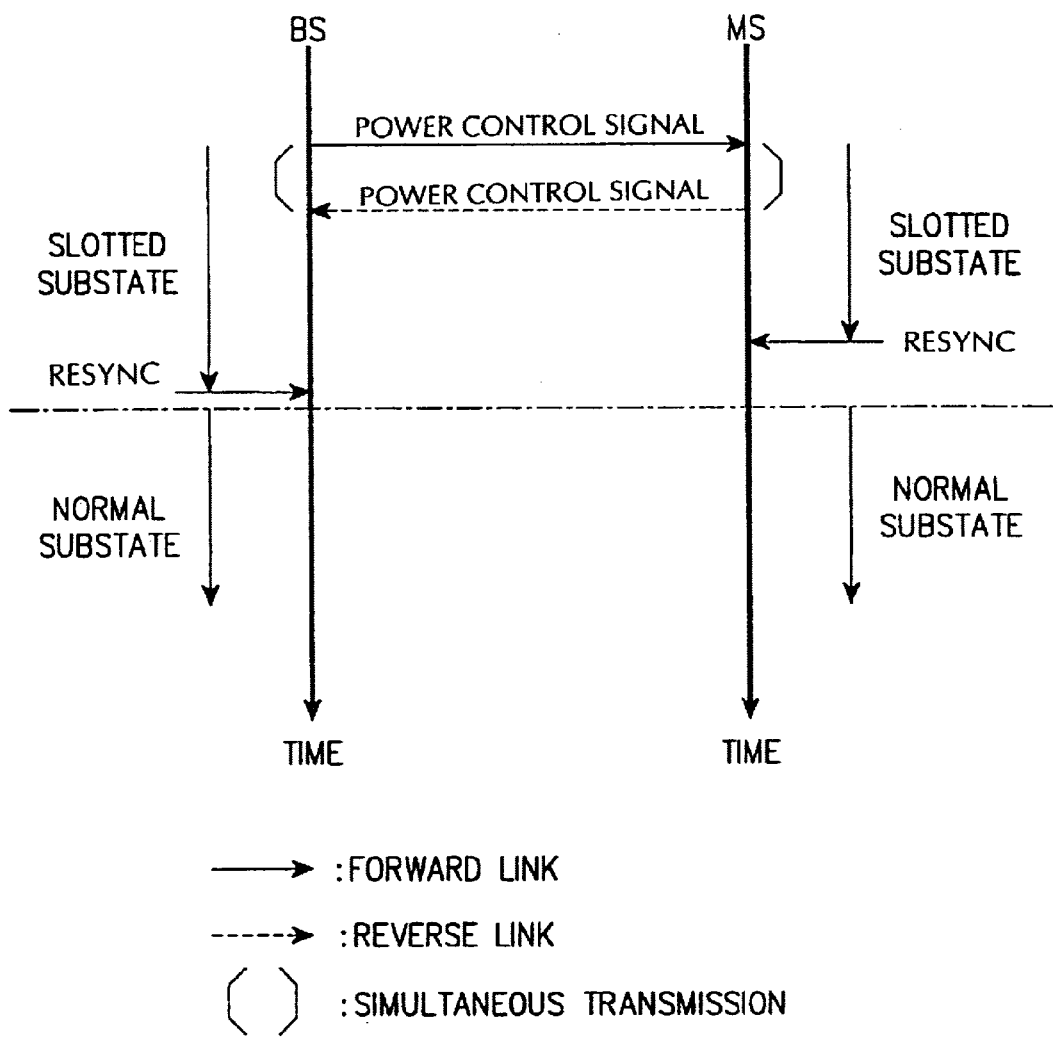
FIG. 7 is a flow diagram illustrating a state transition from a slotted substate to a normal substate according to an embodiment of the present invention.
Figure 8:
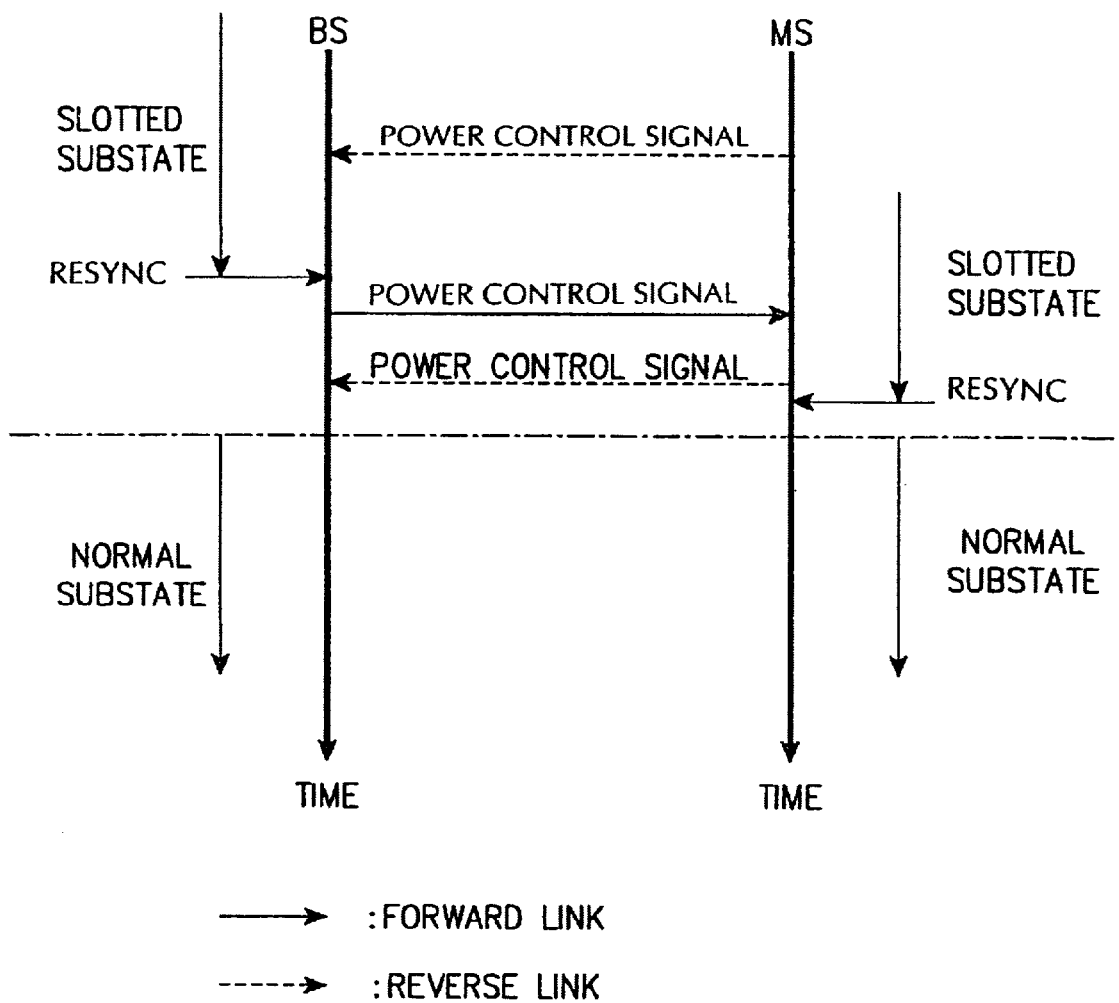
FIG. 8 is a flow diagram illustrating power level arbitration performed when a mobile station requests the power level arbitration to transmit/receive data.
Figure 9:
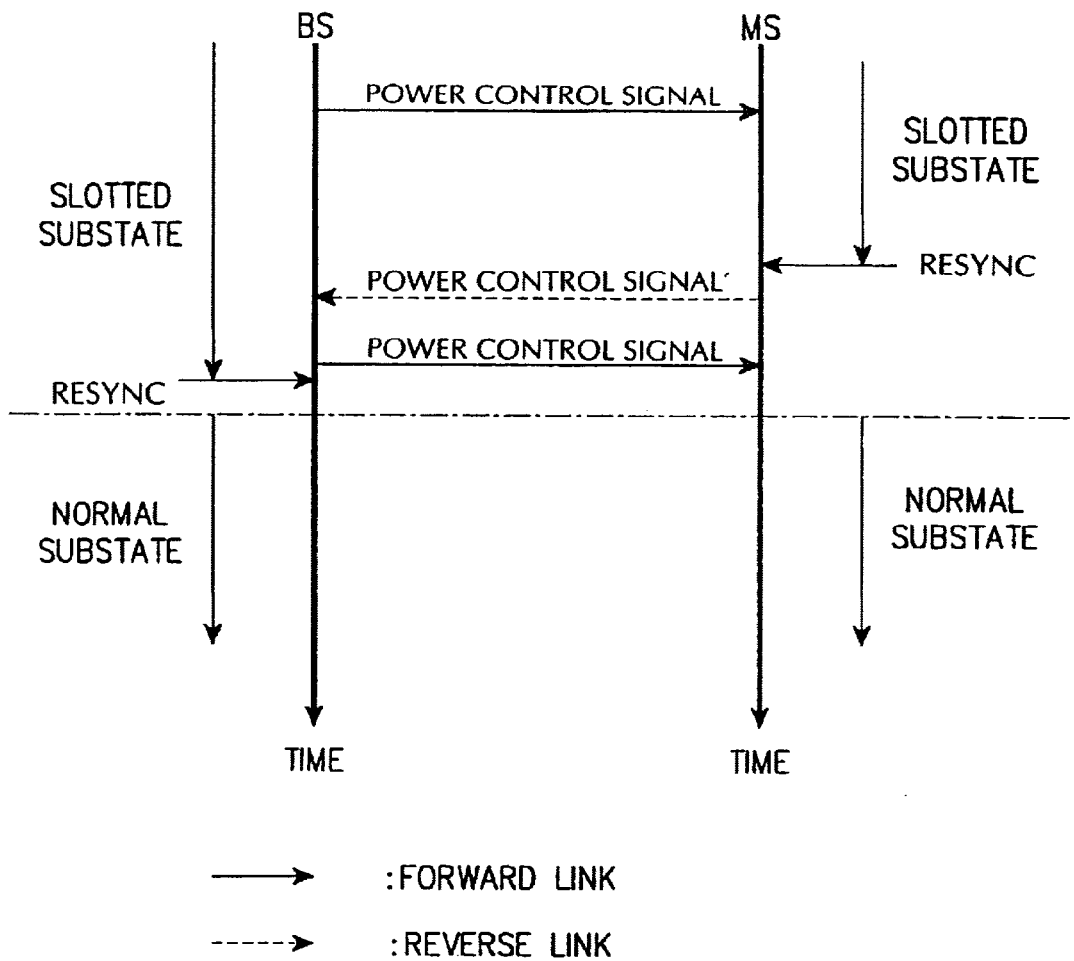
FIG. 9 is a flow diagram illustrating power level arbitration performed when a base station requests the power level arbitration to transmit/receive data.
Figure 10:
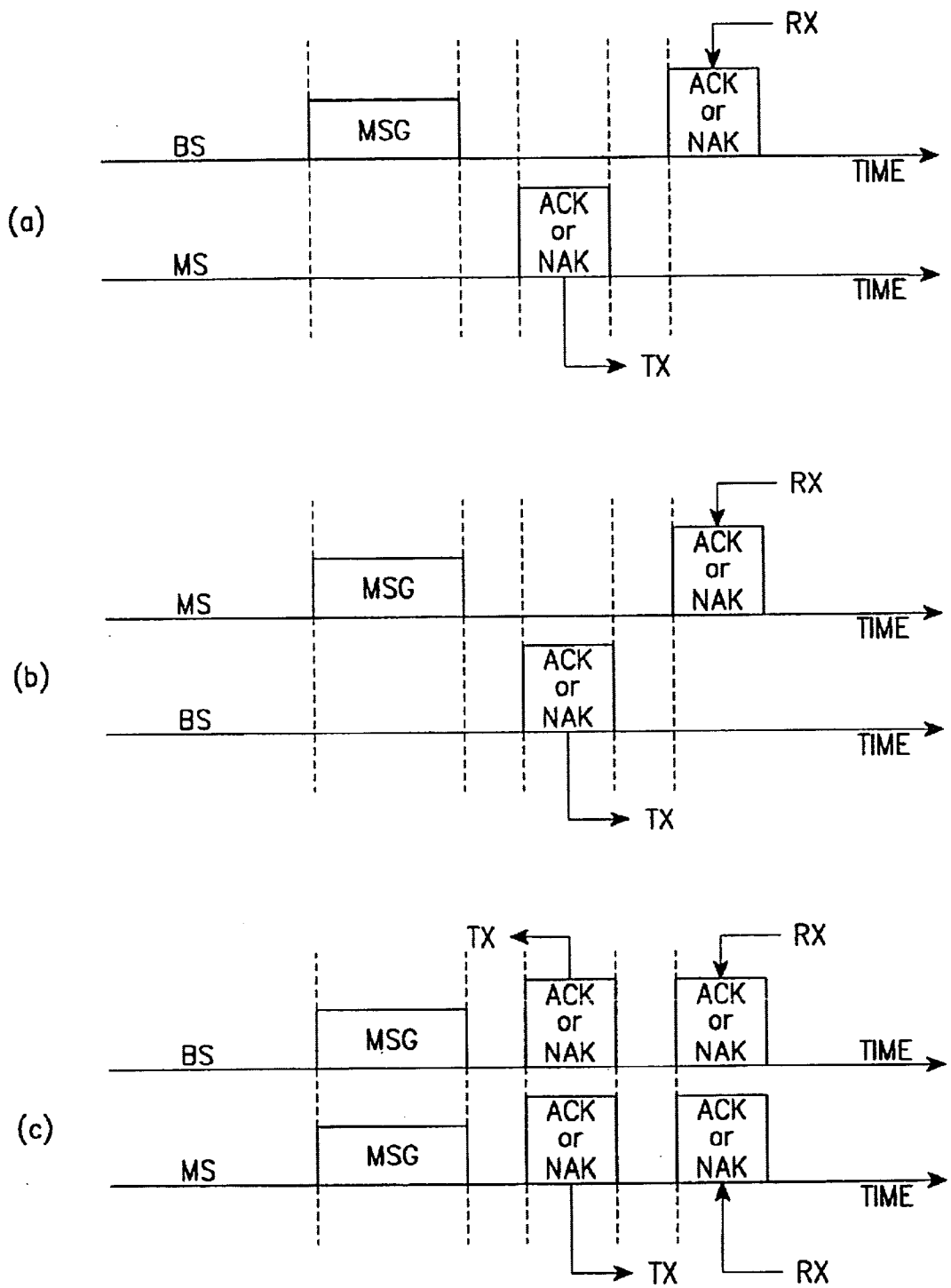
FIGS. 10A through 10C are diagrams illustrating methods for detecting channel conditions after a transition to a normal substate.

FIGS. 7 through 9 are message flow diagrams illustrating the power level arbitration processes performed between the base station and the mobile station, corresponding to the previously described three embodiments.

Referring to FIG. 7, illustrates the messaging for the first embodiment. FIG. 7 illustrates the power level arbitration process in the case where the power level arbitration time is scheduled between the base station and the mobile station. In the slotted substate, the base station transmits a power control bit to the mobile station with an appropriate initial power at a time scheduled between the base station and the mobile station to make a power arbitration for transition to the normal substate. At the same time, the mobile station also transmits a power control bit to the base station, unrelated to the power control but described above, with an appropriate initial power. In the reverse link, the initial transmission power should be low enough not to affect the system. An initial transmission power, $P_{MS}$, of the mobile station can be defined as $$P_{MS} = (1^{st} \text{ constant}) - (\text{Total Receiving Power}) \qquad (1)$$

or $$P_{MS} = (2^{nd} \text{ constant}) - (\text{Rx Power of Pilot Signal from Connected Base Station}) \qquad (2)$$

In the forward link, a limitation on the initial transmission power of the base station is less serious, as compared with that of the mobile station. For setting the initial transmission power of the base station, several methods may be employed. In one method, it is contemplated that the base station transmit the power control bit with a specific initial power. The specific initial power can be determined according to a transmission power, PBS, of a pilot signal transmitted from the base station via the forward link pilot channel, as expressed by equation (3). In a second method, the base station transmits the power control bit with its maximum power. The maximum power of the base station is previously set to a maximum value within the range where the base station does not cause interference to the other cells. When the base station transmits the power control bit with the maximum initial power, the transmission power control of the mobile station will precede the base station, reducing an influence on the system. In other words, the mobile station can receive the base station transmitted power control but more easily than the base station. Therefore, the MS control of the BS transmission power will precede the BS control of the MS transmission power.

$$P_{BS}=(\text{Tx Power of Pilot Signal of Base Station})/(3^{rd} \text{ Constant}) \quad (3)$$

In equations (1) through (3), the first, second and third constants can be set to optimal values by way of experiment to meet the system capacity.

In FIG. 7, since power level arbitration is performed at scheduled intervals, the base station and the mobile station can know whether the other party transmits the power control bit, even though they fail to receive the power control bit transmitted from the other party. In this case, upon failure to receive the power control bit transmitted from the other party, the base station or the mobile station send a power-up control bit to the other party on the judgement that the transmission power of the other party is lower than a threshold. When the mobile station and the base station both receive the power control bit with an appropriate power, the power level arbitration is completed. Here, if necessary, a prompt transition from the slotted substate to the normal substate can take place. This is because it is possible to transmit a state transition message with high reliability since the initial transmission power is set to an optimal level. In FIG. 7, when the base station or the mobile station has a packet data to exchange in the normal substate, a transition to the active state occurs to transmit the packet data. However, when the base station and the mobile station do not have a packet data to exchange, a transition to the slotted substate occurs after predetermined time or exchange state transition message. Here, in the reverse link, the power control bit can be transmitted via the pilot channel; in the forward link, the power control bit can be transmitted via the dedicated control channel.

FIGS. 8 and 9 show the unscheduled power level arbitration methods in which the power level arbitration is performed only when the base station or the mobile station has data to transmit. More specifically, FIG. 8 shows the case where the mobile station initiates the power level arbitration to exchange data, and FIG. 9 shows the case where the base station initiates the power level arbitration to exchange data.

Referring to FIG. 8, when there is data to exchange in the slotted substate, the mobile station transmits the power control bit with a sufficiently low initial transmission power to the base station, for power level arbitration. The mobile station transmits the power control bit with increasing the transmission power incrementally for power level arbitration until the power control bit is received from the base station. Upon receipt of the power control bit in the slotted substate, the base station transmits a power control bit to the mobile station with a initial power corresponding to the received power control bit.

In the case where the initial transmission power of the base station is in reverse proportion to the power control bit strength transmitted from the mobile station, the base station transmits a power-up control bit while increasing the transmission power step by step, until the mobile station changes the transmission power of the reverse link according to the power control bit received from the base station.

Further, in the case where the base station transmits the power control bit with an initial transmission power independent of the received power control bit, the base station transmits a power-down control bit at a maximum transmission power, until the mobile station changes its transmission power according to the power control bit received from the base station.

Through this procedure, when the mobile station receives the power control bit from the base station, the power level arbitration process is considered completed so that the base station and the mobile station can make a prompt transition from the slotted substate to the normal substate exchanging state transition message.

In some cases, the mobile station may fail to receive the power control bit that the base station has transmitted via the forward link upon receipt of the power control bit from the mobile station. In this case, the mobile station transmits the power control bit with an increased power on the judgement that the base station has failed to receive the power control bit transmitted from the mobile station itself. Although the base station has transmitted a power-down command via the forward link, the mobile station continues to increase its transmission power due to failure to receive the transmitted power-down command, causing system problems during this interval. To solve this problem, the initial transmission power of the base station is set to its maximum power so that the mobile station can quickly receive the power control bit from the base station, thereby minimizing the trouble interval. After the transition to the normal substate, the mobile station transitions to the active state to transmit the data to the base station by exchanging state transition message.

Next, referring to FIG. 9, when data to transmit is generated in the slotted substate, the base station indicates power level arbitration by transmitting a power control bit with an appropriate initial transmission power to the mobile station. For the initial transmission power of the base station, refer to the associated description given with reference to FIG. 7. For power level arbitration, the base station increases the transmission power step by step to transmit the power control bit with the increased power until a power control bit is received from the mobile station. In the case where the power control bit received from the base station is a power-up control bit, the mobile station responds to the power-up command by increasing the transmission power step by step if the initial transmission power of the mobile station is set at a sufficiently low initial power. However, if the initial transmission power of the base station was set to its maximum transmission power, the mobile station continues to receive the power control bit with the maximum transmission power.

In summary, upon receipt of the power control bit from the base station in the slotted substate, the mobile station transmits a power control bit to the base station with an initial transmission power according to the received power control bit. The mobile station continuously increases the transmission power until a power-down control bit is received from base station. As the base station receives the power control bit from the mobile station with an appropriate power, the power level arbitration is completed. Then, the base station and the mobile station can make a quick transition from the slotted substate to the normal substate, because a state transition request message and an acknowledge message can be transmitted with a high reliability after the power level arbitration. After the transition to the normal substate, the base station transitions to the active state to transmit the data to the mobile station.

In FIGS. 7 through 9, the base station and the mobile station exchange the power control bits to perform the power level arbitration. Upon transition to the normal substate after the power level arbitration, it is possible to immediately detect a channel condition.

FIGS. 10A through 10C are diagrams illustrating methods for detecting the channel condition after the transition to the normal substate in the manner of FIGS. 7 through 9. There are several methods for detecting the channel condition. In a first method of FIG. 10A, the base station transmits to the mobile station a message (MSG) known to both the base station and the mobile station. In a second method of FIG. 10B, the mobile station transmits to the base station a message known to both the base station and the mobile station. In a third method of FIG. 10C, the base station and the mobile station simultaneously transmit messages known to themselves to each other.

First, referring to FIG. 10A, upon receipt of the message transmitted from the base station, the mobile station transmits an ACK signal. Upon receipt of a CRC error indicating a failure or upon failure to receive the message transmitted from the base station within a predetermined time, the mobile station transmits a NACK (negative ACK) signal. Upon receipt of the ACK signal, the base station judges that the forward link and the reverse link are both in good condition. However, upon receipt of the NACK signal, the base station judges that the forward link is in a bad condition but the reverse link is in a good condition. In addition, upon failure to receive both the ACK signal and the NACK signal, the base station cannot judge which of the two links is in a bad condition. The base station can merely presume that one of the two links or both of them are in a bad condition.

Next, referring to FIG. 10B, upon receipt of the message transmitted from the mobile station, the base station transmits an ACK signal. Upon receipt of a message indicating failure or upon failure to receive the message transmitted from the mobile station within a predetermined time, the base station transmits a NACK signal. Upon receipt of the ACK signal, the mobile station judges that the forward link and the reverse link are both in a good condition. However, upon receipt of the NACK signal, the mobile station judges that the reverse link is in a bad condition but the forward link is in a good condition. In addition, upon failure to receive both the ACK signal and the NACK signal, the mobile station cannot judge which of the two links is in a bad condition. The mobile station can merely presume that one of the two links or both of them are in a bad condition.

Referring to FIG. 10C, the base station and the mobile station simultaneously transmit to each other the messages known to themselves. Thereafter, upon receipt of the message transmitted from the other party, the base station and the mobile station transmit ACK signals to each other; upon receipt of a failed message or upon failure to receive the message transmitted from the other party within a predetermined time, the base station and the mobile station transmit NACK signals to the other party. Upon receipt of the ACK signal, the base station judges that the forward link and the reverse link are both in a good condition. However, upon receipt of the NACK signal, the base station judges that the forward link is in a bad condition but the reverse link is in a good condition. In addition, upon failure to receive both the ACK signal and the NACK signal, the base station cannot judge which of the two links is in a bad condition. The base station can merely presume that one of the two links or both of them are in a bad condition. Furthermore, upon receipt of the ACK signal, the mobile station judges that the forward link and the reverse link are both in a good condition. However, upon receipt of the NACK signal, the mobile station judges that the reverse link is in a bad condition but the forward link is in a good condition. In addition, upon failure to receive both the ACK signal and the NACK signal, the mobile station cannot judge which of the two links is in a bad condition. The base station can merely presume that one of the two links or both of them are in a bad condition.

In the method of FIG. 10A, the base station can detect the channel condition, so that this method can be applied to the case where the base station initiates the power level arbitration to transmit data. In the method of FIG. 10B, the mobile station can detect the channel condition, so that this method can be applied to the case where the mobile station initiates the power level arbitration to transmit data. In the method of FIG. 10C, the base station and the mobile station both can detect the channel condition, so that this method can be applied to the scheduled power level arbitration in which the power level arbitration is performed at the scheduled time even though there is no data to transmit.

Figure 11A:
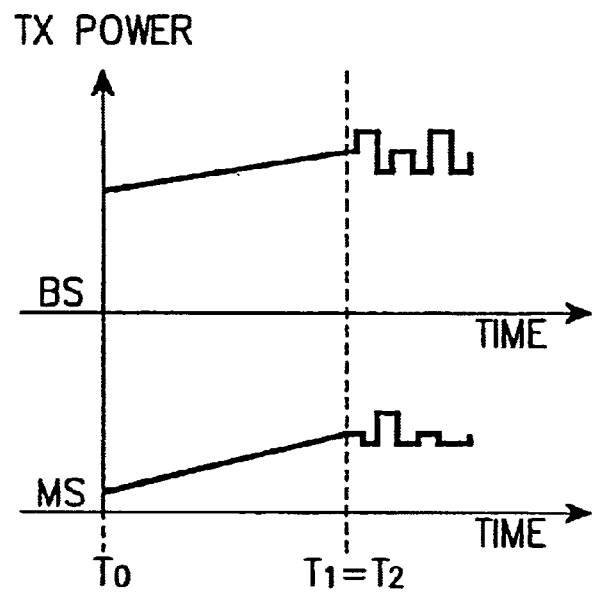
FIGS. 11A through 11C are diagrams illustrating variations in a transmission power and a power control bit with the passage of time during the power level arbitration.
Figure 11A:
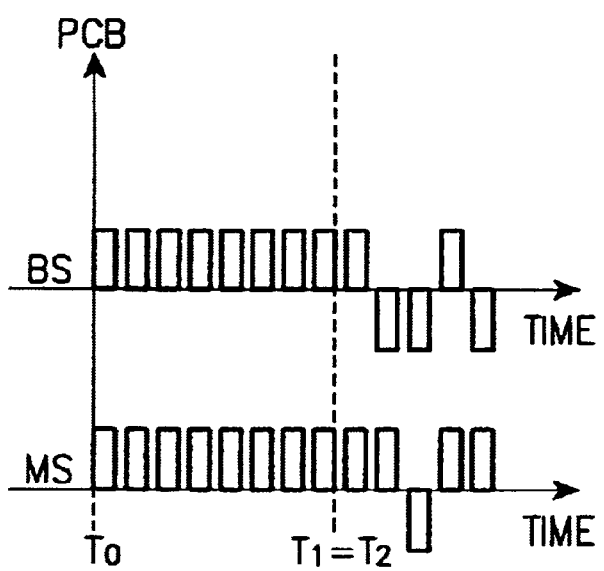
Figure 11B:
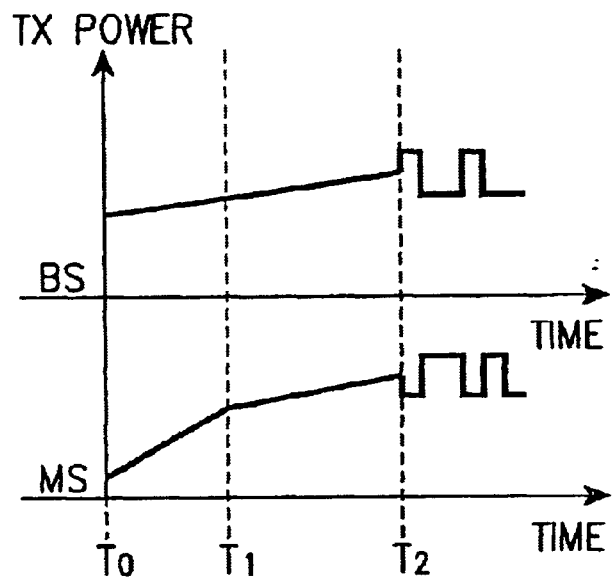
Figure 11B:
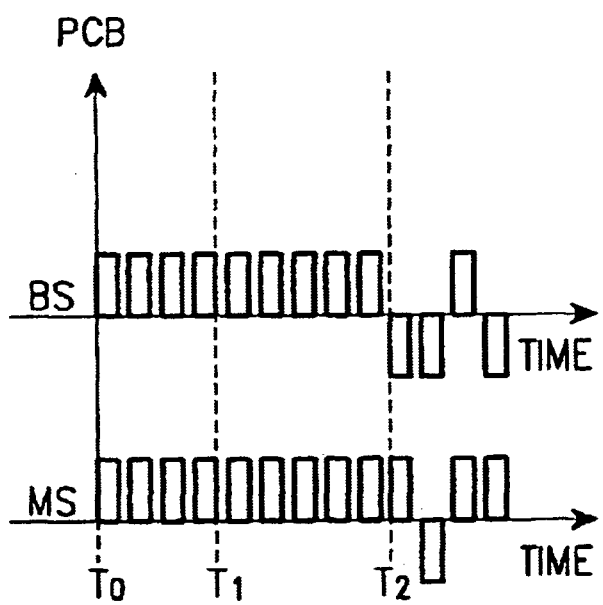
Figure 11C:
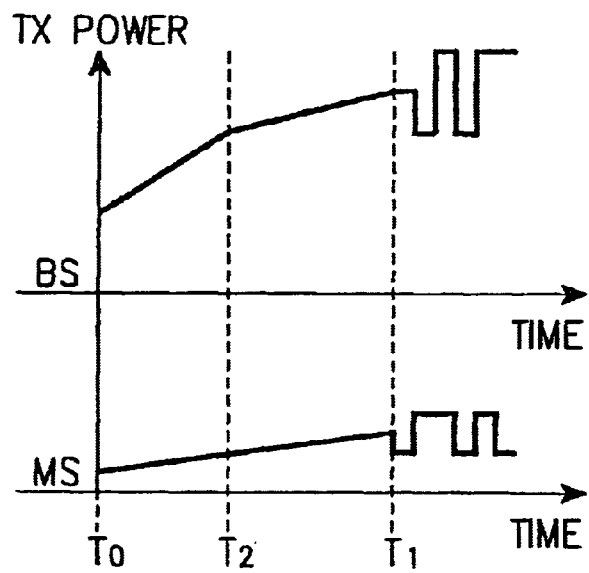
Figure 11C:
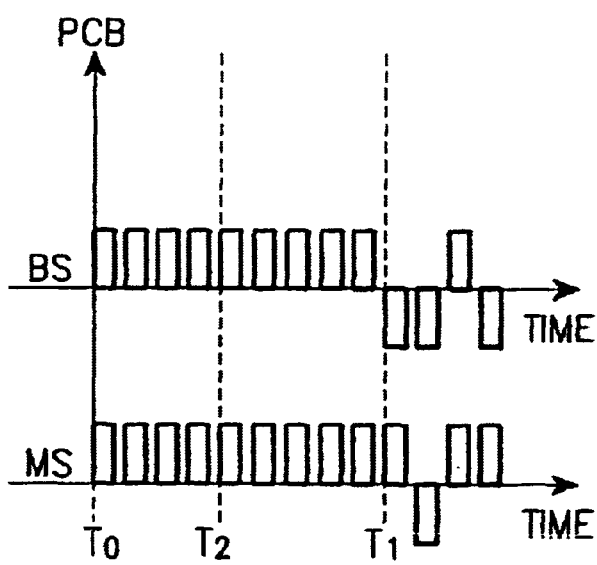

FIGS. 11A through 11C are diagrams illustrating variations in a transmission power and a power control bit with the passage of time during the scheduled power level arbitration. More specifically, FIG. 11A shows the case where the base station and the mobile station simultaneously receive the messages transmitted from the other party; FIG. 11B shows the case where the mobile station receives the message transmitted from the other party (i.e., the base station) before the base station receives the message transmitted from the other party (i.e., the mobile station); FIG. 11C shows the case where the base station receives the message transmitted from the other party before the mobile station receives the message transmitted from the other party. In FIGS. 11A through 11C, $T_0$ denotes a power level arbitration start time. Since the power level arbitration is performed at the scheduled time no matter whether there is data to transmit, the base station and the mobile station simultaneously initiate the power level arbitration at the power level arbitration start time $T_0$. Further, $T_1$ denotes a time where the mobile station receives the power control bit transmitted from the base station, and $T_2$ denotes a time where the base station receives the power control bit transmitted from the mobile station.

Referring to FIG. 11A, the base station and the mobile station simultaneously receive the power control bits transmitted from the other party at the time $T_1$ (=$T_2$). Prior to receiving the power control bit transmitted from the other party, the base station and the mobile station both transmit the power control bits by increasing the transmission power step by step. Upon receipt of the power control bits transmitted from the other party, the base station and the mobile station varies their respective transmission powers according to the received power control bits. As it is perceived that the other party controls the transmission power according to the transmitted power control bit, the base station and the mobile station exchange a state transition message and an ACK signal to make a transition to the normal substate.

Although the present invention is described with reference to an embodiment which transmits a state transition message and an ACK signal, for state transition, it is also possible to make a state transition by informing an upper layer that the power level arbitration has been completed in a physical layer.

Referring to FIG. 11B, the mobile station receives the power control bit transmitted from the base station at the time $T_1$. However, at this time, the base station cannot receive the power control bit transmitted from the mobile station because the MS initial power is set low. The base station then increases the transmission power step by step and transmits a power control bit at the increased transmission power level once each $1.25_{MS}$. After passage of power level arbitration, beginning from the time $T_2$ where the base station receives the power control bit transmitted from the mobile station, the base station and the mobile station vary the transmission power according to the power control bits received from the other party, respectively. As it is perceived that the other party controls the transmission power according to the transmitted power control bit, the base station and the mobile station exchange a state transition message and an ACK signal to make a transition to the normal substate on the judgement that the power level arbitration process is completed.

Referring to FIG. 11C, the base station receives the power control bit transmitted from the mobile station at the time $T_2$. However, at this time, the mobile station cannot receive the power control bit transmitted from the base station. The mobile station then increases the transmission power little by little and transmits the power control bit with the increased transmission power. After passage of such a transition period, beginning from the time $T_1$ where the mobile station receives the power control bit transmitted from the base station, the base station and the mobile station vary the transmission power according to the power control bits received form the other party, respectively. As it is perceived that the other party controls the transmission power according to the transmitted power control bit, the base station and the mobile station exchange a state transition message and an ACK signal to make a transition to the normal substate on the judgement that the power level arbitration process is completed.

In FIGS. 11A through 11C, the initial transmission power is determined as described with reference to FIG. 7. The power level arbitration methods of FIGS. 11A and 11B will not affect the system performance, but the power level arbitration method of FIG. 11C may affect the system performance. In FIG. 11C, the time $T_2$ where the base station receives the power control bit transmitted from the mobile station precedes the time $T_1$ where the mobile station receives the power control bit transmitted form the base station. The base station can receive the power control bit transmitted from the mobile station, when the receiving power of the power control bit received from the mobile station is similar in level to the receiving powers of signals transmitted from other mobile stations. However, even though the base station transmits the power control bit by comparing the receiving power of the signal from the mobile station with the receiving powers of the signals from the other mobile stations, the mobile station cannot receive the power control bit transmitted from the base station. Therefore, the mobile station will continuously increase the transmission power on the judgement that the base station has transmitted a power-up control bit. As such an interval between $T_2$ and $T_1$ increases, the mobile station will transmit the power control bit with a transmission power much higher than an appropriate transmission power, wasting the transmission power. To solve this problem, it is preferable that the base station transmits the power control bit with its maximum transmission power from the beginning of the power level arbitration process. The forward link channels are spread with orthogonal codes (e.g., Walsh codes). Therefore, the base station can transmit to the mobile station the power control bit with its maximum transmission power, without interference to the other mobile stations. By transmitting the power control bit with the maximum transmission power, the base station may have a very low probability of receiving the power control bit transmitted from the other party before the mobile station receives the power control bit from the other party. In FIGS. 11A through 11C, after receiving the power control bits from the other party, the base station and the mobile station can control the transmission power in a different way.

Figure 12A:
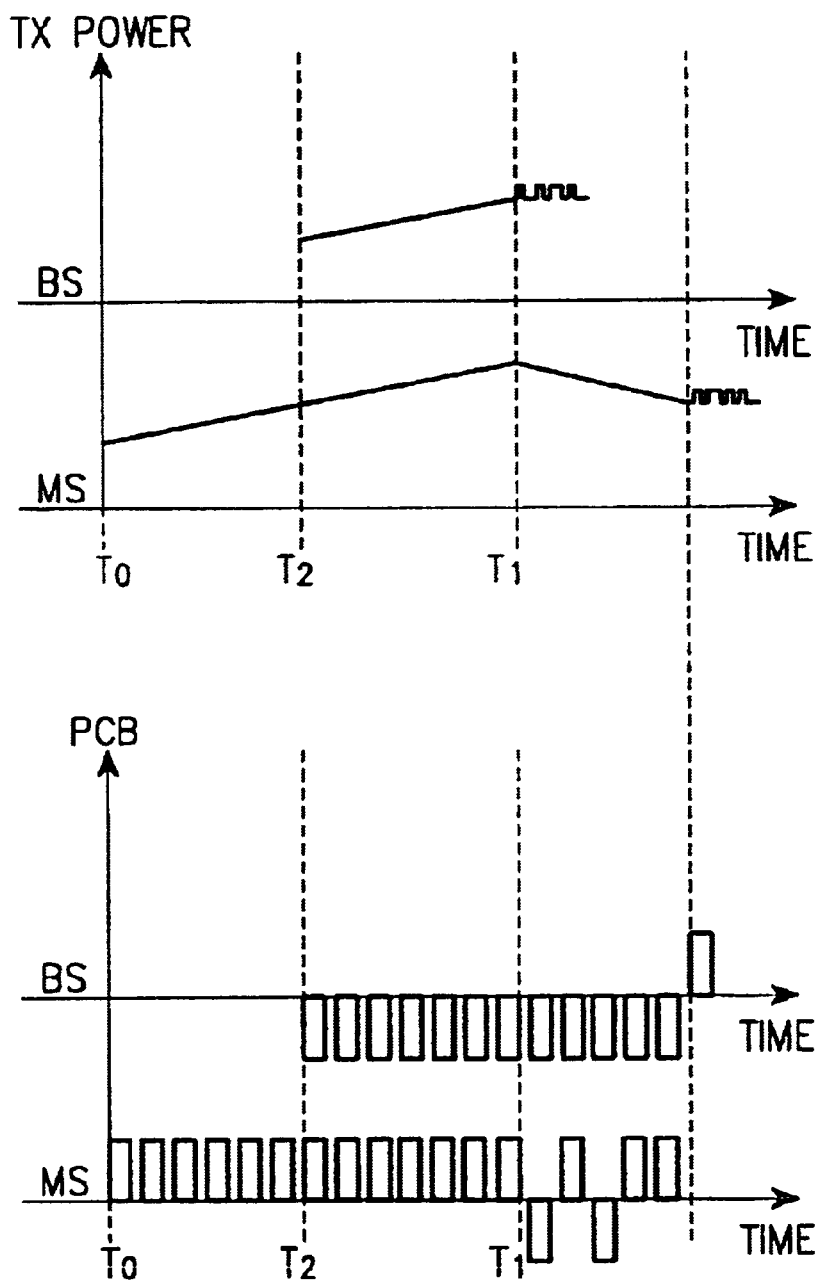
FIGS. 12A and 12B are diagrams illustrating variations in a transmission power and a power control bit with the passage of time in the case where the power level arbitration is requested by a party having data to transmit in a slotted substate.
Figure 12B:
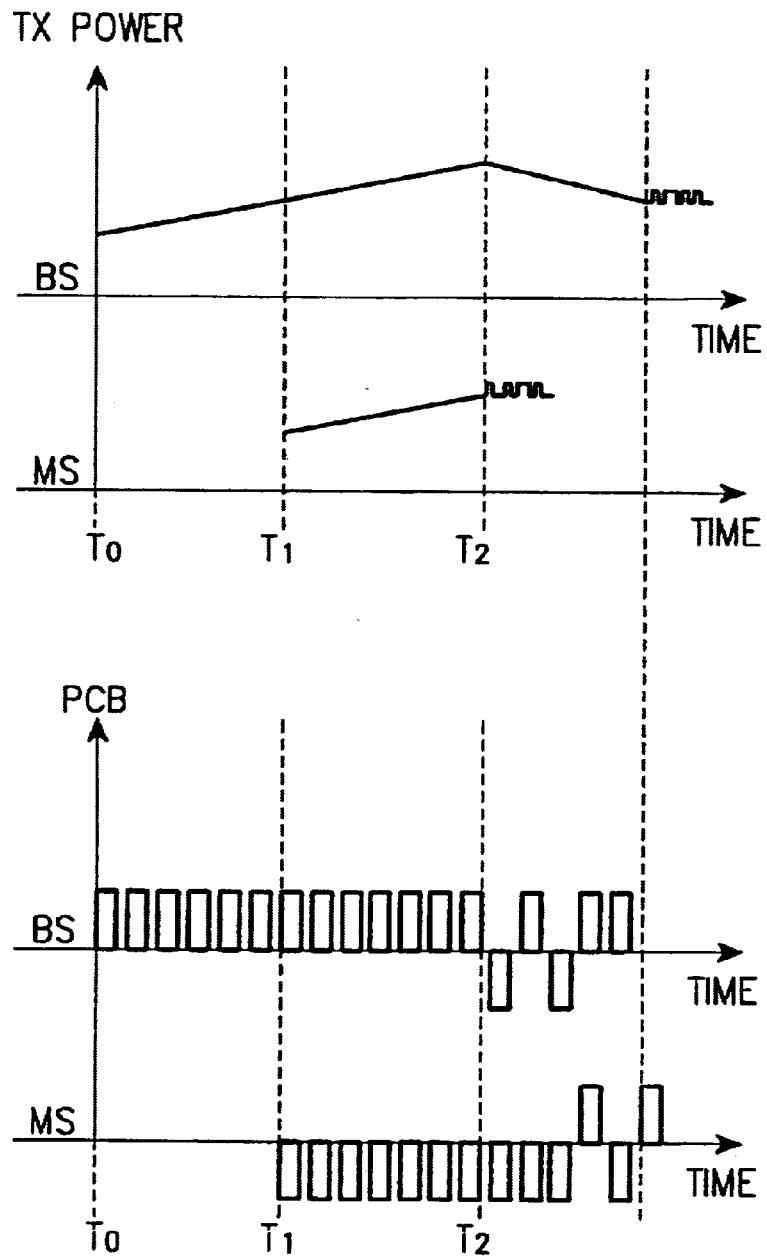
Figure 13:
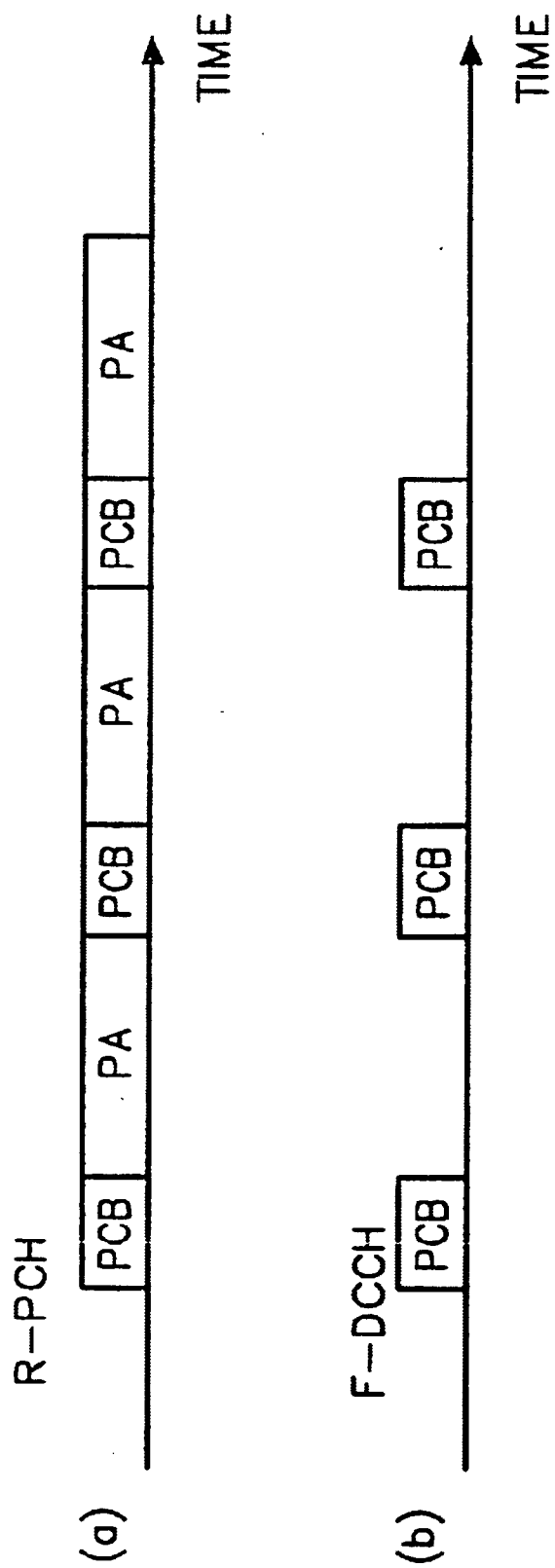
FIGS. 13A and 13B are diagrams illustrating signaling messages transmitted via a reverse link pilot channel and a forward link dedicated control channel during the power level arbitration.

FIGS. 12A and 12B are diagrams illustrating variations in transmission power with time and the transmission of power control bits with time in the case where power level arbitration is requested by a party having data to transmit in a slotted substate. More specifically, FIG. 12A shows the case where the mobile station requests the power level arbitration to transmit data, and FIG. 12B shows the case where the base station requests the power level arbitration to transmit data.

Referring to FIG. 12A, when mobile station data to transmit while in the slotted substate, the mobile station transmits a power control bit to the base station to perform a power level arbitration. An initial transmitting power for transmitting the power control bit is set to a sufficiently low level so as not to adversely affect the system. For the initial transmission power, refer to the associated description given with reference to FIG. 7. Upon failure to receive a power control bit transmitted from the base station, the mobile station increases the transmission power in incremental steps, on the judgement that the base station has not received the power control bit transmitted from the mobile station. The mobile station increases the transmission power little by little in an interval between $T_0$ and $T_1$. Upon receipt of the power control bit transmitted from the mobile station at the time $T_2$, the base station measuring the power of the received power control bit and generating power control bit for control mobile station transmission power and transmits the power control bit with the adjusted transmission power by received power control bit from the mobile station. In the interval between $T_2$ where the base station receives the power control bit transmitted from the mobile station and $T_1$ where the mobile station receives the power control bit transmitted from the base station, the base station and the mobile station both may increase the transmission power step by step. In FIG. 12A, that the base station receives the power control bit transmitted from the mobile station at the interval $T_2$ means that a receiving power of the power control bit from the mobile station is similar in level to the receiving powers of the signals transmitted from the other mobile stations. However, in the interval between $T_2$ and $T_1$, since the mobile station cannot receive the power control bit transmitted from the base station, it continuously increases the transmission power. As the interval between $T_2$ and $T_1$ increases, the receiving power of the power control bit received from the mobile station is much higher than the receiving power of the signals received from the other mobile stations, affecting the overall system performance. To minimize the interval between $T_2$ and $T_1$, it is preferable that upon receipt of the power control bit transmitted from the mobile station in the slotted substate, the base station transmits the power control bit with its maximum transmission power. As the mobile station receives the power control bit transmitted from the base station at the time $T_1$, the base station and the mobile station adjust the transmission powers according to the power control bits received from the other party. As it is perceived that the other party controls the party's transmission power according to the received power control bit power level, the base station and the mobile station exchange a state transition message and an ACK signal to make a transition to the normal substate on the judgement that the power level arbitration process is completed.

Base Station in a Slotted Substate Initiates Power Level Arbitration to Transmit Data Referring to FIG. 12B, when the base station has data to be transmitted by the base station in the slotted substate, the base station transmits a power control bit to the mobile station, for power level arbitration. An initial power for transmitting the power control bit is set to an appropriate level or the maximum transmission power of the base station. For a fuller description of the initial transmission power level, refer to the associated description given with reference to FIG. 7. Upon failure to receive a power control bit transmitted from the mobile station, the base station increases the transmission power in small increments, on the judgement that the mobile station has not received the power control bit transmitted from the base station. The base station increases the transmission power incrementally in an interval between $T_0$ and $T_2$. Upon receipt of the power control bit transmitted from the base station at the time $T_1$, the mobile station generates a power control bit for control, the base station transmission power according to the received power control bit power level, beginning from the sufficiently low initial transmission power, and transmits the power control bit with the adjusted transmission power to the base station. In the interval between $T_1$ where the mobile station receives the power control bit transmitted from the base station and $T_2$ where the base station receives the power control bit transmitted from the mobile station, the base station and the mobile station both increase their respective transmission powers incrementally. As the base station receives the power control bit transmitted from the mobile station at the time $T_2$, the base station and the mobile station adjust the transmission powers according to the power control bits received from the other party. As it is perceived that the other party controls the other party's transmission power according to the received power control bit power level, the base station and the mobile station exchange a state transition message and an ACK signal to make a transition to the normal substate on the judgement that the power level arbitration process is completed.

In FIGS. 12A and 12B, since the power level arbitration is performed where there is data to transmit, a transition to the active state occurs immediately after transitioning to the normal substate.

Signaling During Power Level Arbitration

FIGS. 13A and 13B are diagrams illustrating signaling messages transmitted via a reverse link pilot channel and a forward link dedicated control channel during the power level arbitration. In the reverse link, the power control bit (PCB) is transmitted via the pilot channel as shown in FIG. 13A; in the forward link, the power control bit is transmitted via the dedicated control channel as shown in FIG. 13B. In FIG. 13A, preamble signals PA enable acquisition and channel estimation. Therefore in the above described example, the base station also generates a power control bit according to the received preamble signal and power control signal. In the embodiment, the preamble signals transmit information known to both the base station and the mobile station. The information known to both the base station and the mobile station can be a bit stream composed of all "0"s or all "1"s.

Power Level Arbitration Method Steps

Figure 14:
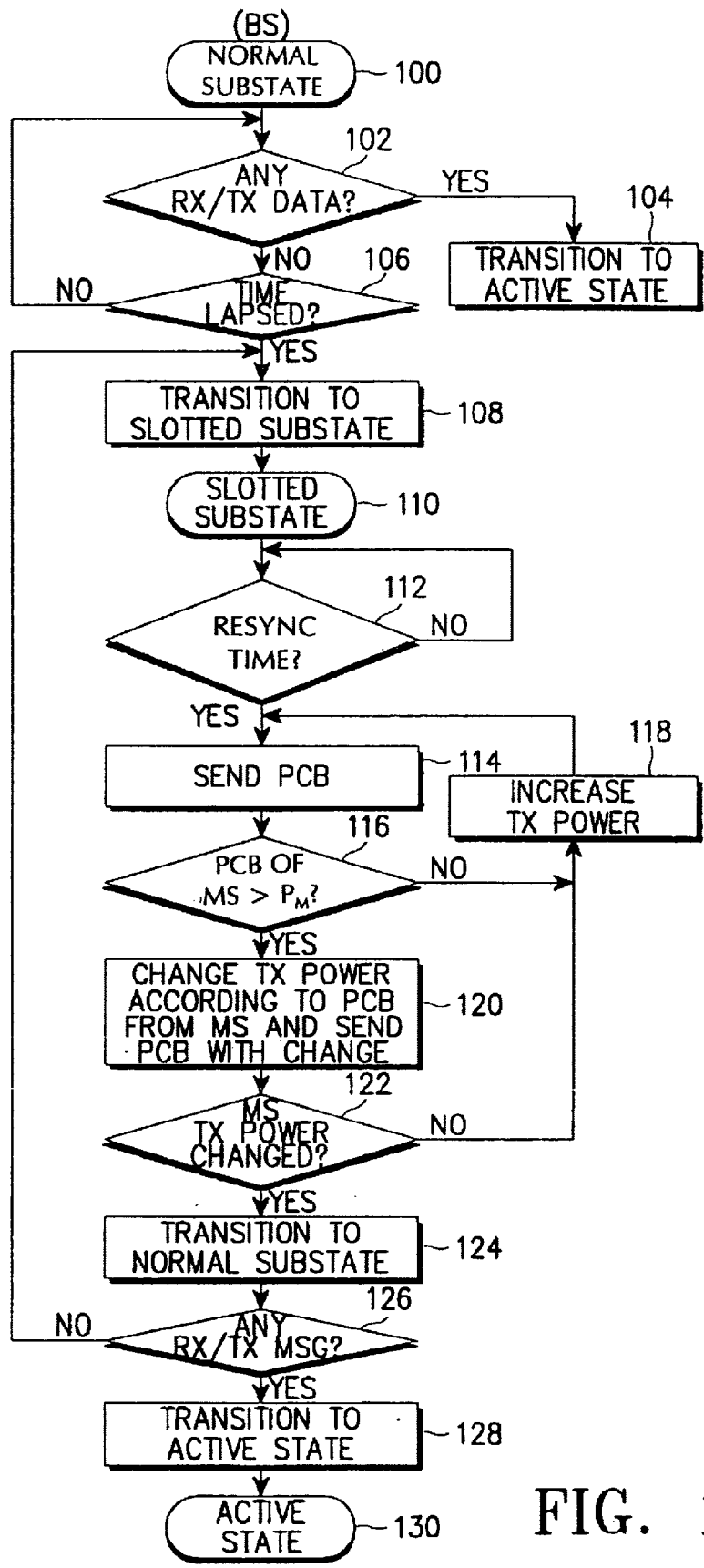
FIG. 14 is a flow chart illustrating scheduled power level arbitration performed by a base station according to an embodiment of the present invention.
Figure 15:
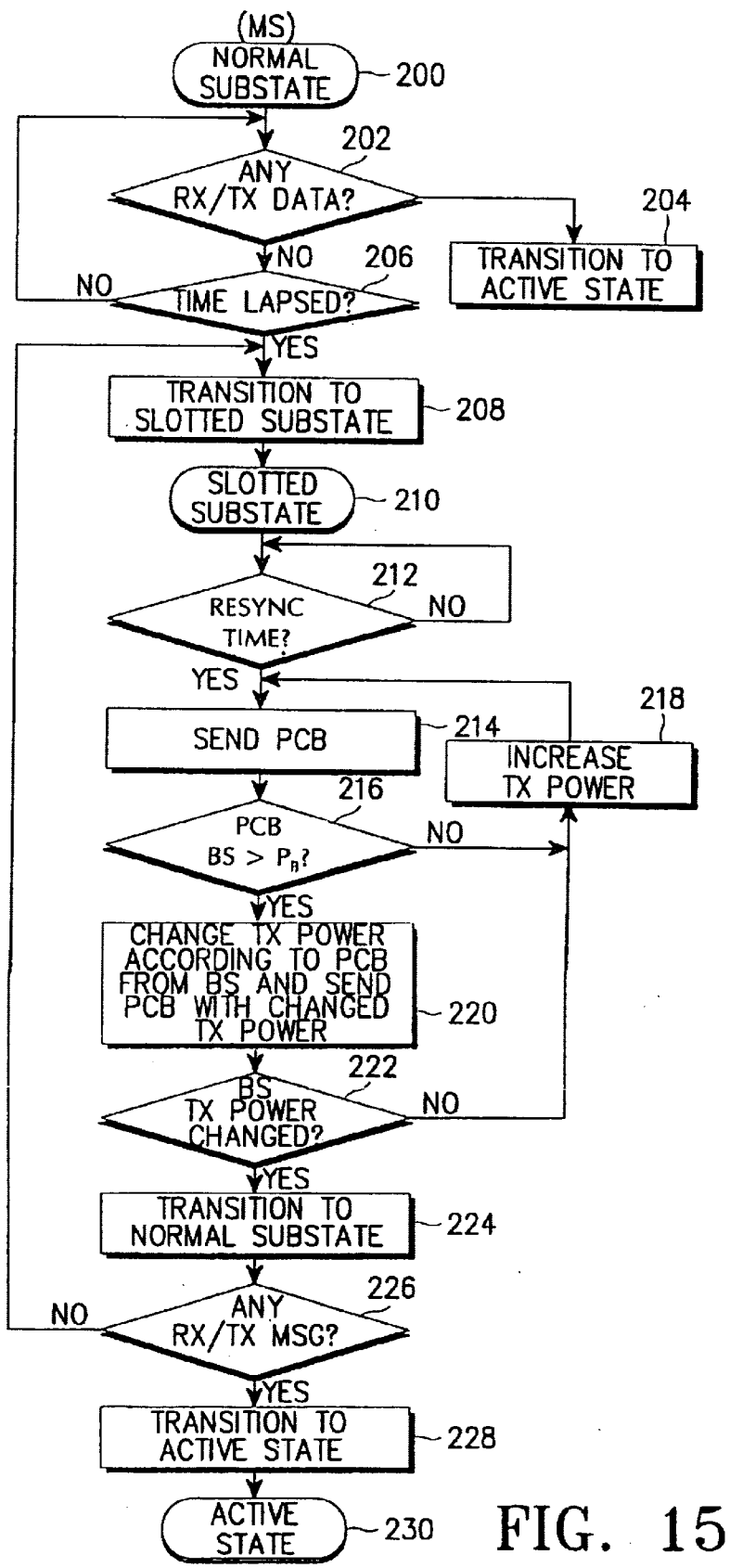
FIG. 15 is a flow chart illustrating scheduled power level arbitration performed by a mobile station according to an embodiment of the present invention.

FIGS. 14 and 15 are flow charts illustrating the scheduled power level arbitration performed in the base station and the mobile station, respectively.

Referring to FIG. 14, in the normal substate (Step 100), the base station monitors whether there is data to transmit (Step 102). When there is data to transmit, a transition to the active state occurs to transmit the data (Step 104). However, when there is no data to transmit, the base station waits a predetermined time (Step 106). Here, the predetermined time is a maximum holding time of the normal substate. When the predetermine time has not elapsed, the normal substate is maintained, otherwise, a transition to the slotted substate takes place (Step 108). In the slotted substate, the base station determines whether it is a power level arbitration time (Step 112). In a call procedure step (not shown) the BS and MS negotiate a power level arbitration time. If it is not time to perform power level arbitration time, the slotted substate is maintained. Otherwise, if it is the power level arbitration time, the base station transmits a power control bit (Step 114). After transmission of the power control bit, the base station determines whether a power control bit is received from the mobile station. The base station cannot receive the power control bit transmitted from the mobile station, if the power control signal transmitted from the mobile station is equal to or lower than a threshold power, $P_M$, of the mobile station. The threshold power $P_M$ is a power level at which the base station can detect a received signal after demodulation. If a receiving power of the power control bit transmitted from the mobile station is equal to or lower than the threshold power $P_M$, the base station increases the transmission power to transmit the power control bit with the increased transmission power on the judgement that the mobile station has not received the power control bit transmitted from the base station (Steps 116 and 118). However, if the receiving power of the power control bit transmitted from the mobile station is higher than the threshold power $P_M$, the base station controls the transmission power of the mobile station according to the received power control bit power level and transmits the power control bit with the adjusted transmission power (Steps 116 and 120). After transmission of the power control bit, the base station determines whether a receiving power of the power control bit transmitted from the mobile station is varied according to the power control bit that the base station has transmitted (Step 122). When there is no variation in the receiving power level of the power control bit transmitted from the mobile station, the base station increases again the transmission power to transmit the power control bit with the increased transmission power (Steps 122 and 118). Variation in the transmission power of the mobile station indicates to the base station that the mobile station has received the power control bit transmitted from the base station. Therefore, upon detecting a variation in the transmission power of the mobile station, the base station makes a transition to the normal substate in any one of the above-stated manners in order to transmit the data, judging that the power level arbitration is completed (Steps 122 and 124).

In FIG. 14, the power level arbitration is performed at a scheduled time regardless of whether there is data to transmit. Therefore, when there is data to transmit, a transition to the active state occurs (Steps 126, 128 and 130). Otherwise, if there is no data to transmit, a transition back to the slotted substate occurs (Step 126 and 108).

Referring to FIG. 15, in the normal substate, the mobile station monitors whether there is data to transmit (Steps 200 and 202). When there is data to transmit, a transition to the active state occurs to transmit the data (Step 204). However, when there is no data to transmit, the mobile station waits a predetermined time (Step 206). Here, the predetermined time is a maximum holding time of the normal substate.

When the predetermine time has not elapsed, the normal substate is maintained, and otherwise, a transition to the slotted substate takes place (Step 208). In the slotted substate, the mobile station determines whether it is a power level arbitration time (Step 212). If it is not the power level arbitration time, the slotted substate is maintained. Otherwise, if it is the power level arbitration time, the mobile station transmits a power control bit (Step 214). After transmission of the power control bit, the mobile station determines whether a power control bit is received from the base station. The mobile station cannot receive the power control bit transmitted from the base station, if the power control signal transmitted from the base station is equal to or lower than a threshold power, $P_B$, of the base station. The threshold power $P_M$ is a power level at which the mobile station can detect a received signal after demodulation. If a receiving power of the power control bit transmitted from the base station is equal to or lower than the threshold power $P_B$, the mobile station increases the transmission power to transmit the power control bit with the increased transmission power on the judgement that the base station has not received the power control bit transmitted from the mobile station (Steps 216 and 218). However, if the receiving power of the power control bit transmitted from the base station is higher than the threshold power $P_B$, the mobile station generates a power down control bit for controlling the base station transmission power of the base station according to the received power control bit and transmits the power control bit with the controlled transmission power (Steps 216 and 220). After transmission of the power control bit, the mobile station determines whether the received power of the power control bit transmitted from the base station is varied according to the power control bit that the mobile station has previously transmitted (Step 222). When there is no variation in the received power of the power control bit transmitted from the base station, the mobile station increases again the transmission power to transmit the power control bit with the increased transmission power (Steps 222 and 218). Variation in the transmission power of the base station indicates to the mobile station that the base station has received the power control bit transmitted form the mobile station. Therefore, upon detecting a variation in the transmission power of the base station, the mobile station makes a transition to the normal substate in any one of the above-stated manners in order to transmit the data, judging that the power level arbitration is completed (Steps 222 and 224). In FIG. 15, the power level arbitration is performed at the scheduled time regardless of whether there is data to transmit. Therefore, when there is data to transmit, a transition to the active state occurs (Steps 226, 228 and 230). Otherwise, if there is no data to transmit, a transition back to the slotted substate occurs (Step 226 and 208).

II. Unscheduled Power Level Arbitration (PLA)

Figure 16:
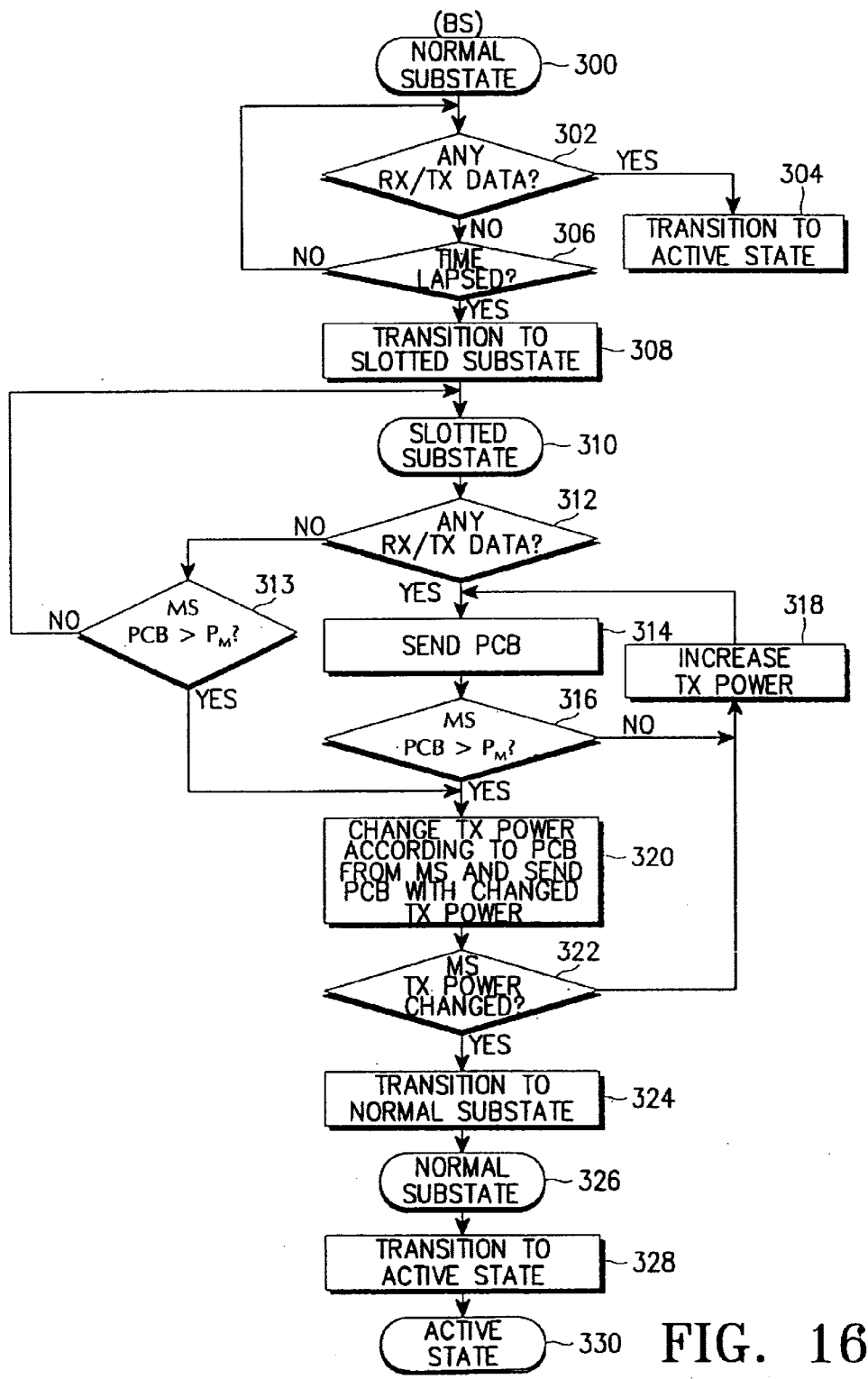
FIG. 16 is a flow chart illustrating unscheduled power level arbitration performed by a base station according to an embodiment of the present invention.
Figure 17:
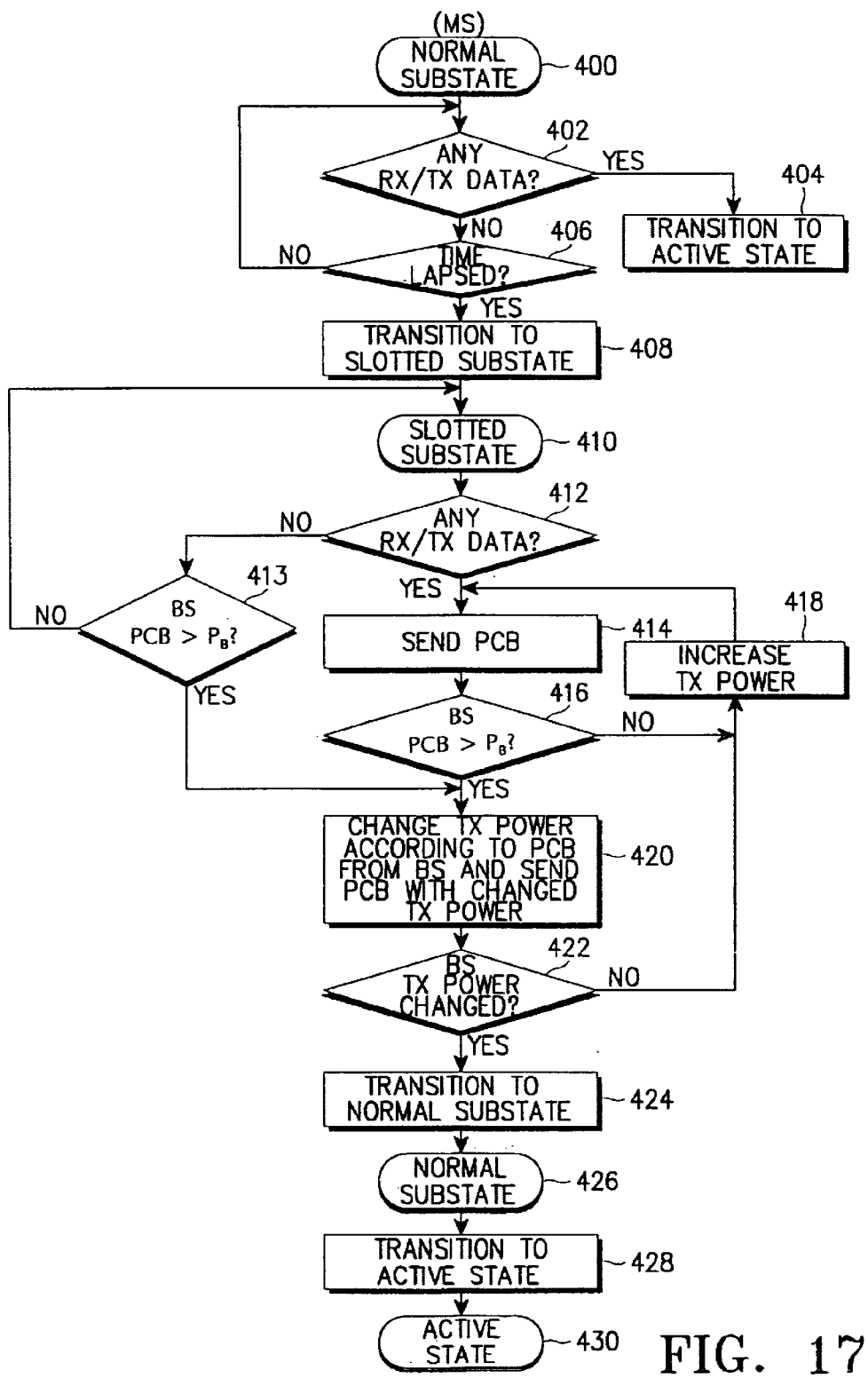
FIG. 17 is a flow chart illustrating unscheduled power level arbitration performed by a mobile station according to an embodiment of the present invention.

FIGS. 16 and 17 are flow charts illustrating the unscheduled power level arbitration performed in the base station and the mobile station, respectively. More specifically, FIG. 16 shows the case where the base station requests the power level arbitration to transmit data when there is data to transmit in the slotted substate; FIG. 17 shows the case where the mobile station requests the power level arbitration to transmit data when there is data to transmit in the slotted substate.

(IIa) Base Station Initiates an Unscheduled PLA

Referring to FIG. 16, in the normal substate, the base station monitors whether there is data to transmit (Steps 300 and 302). When there is data to transmit, a transition to the active state occurs to transmit the data (Step 304). However, when there is no data to transmit, the base station waits a predetermined time (Step 306). Here, the predetermined time is a maximum holding time of the normal substate. When the predetermine time has not elapsed, the normal substate is maintained, and otherwise, a transition to the slotted substate takes place (Step 308). In the slotted substate, the base station determines whether there is data to transmit/receive (Step 312). The case that there is data to transmit/receive corresponds to the case where the base station requests the power level arbitration. On the contrary, the case that there is no data to transmit/receive corresponds to the case where the mobile station requests the power level arbitration.

If there is no data to transmit/receive in the slotted substate (Step 310), the base station determines whether the mobile station has transmitted a power control bit (Steps 312 and 313). If it is judged that the mobile station has not transmitted the power control bit, the base station maintains the slotted substate. To determine whether the mobile station has transmitted the power control bit, the base station compares a transmission power of the mobile station with a threshold power, $P_M$, of the mobile station. If it is judged that the mobile station has transmitted the power control bit, the base station controls the transmission power according to the power control bit transmitted from the mobile station and transmits the power control bit with the controlled transmission power (Steps 313 and 320). After transmission of the power control bit, the base station determines whether the mobile station has changed the transmission power according to the power control bit transmitted from the base station (Step 322). If there is no variation in the transmission power of the mobile station, the base station increases again the transmission power to transmit the power control bit with the increased transmission power (Steps 322 and 318). Upon detecting variation in the transmission power of the mobile station, the base station makes a transition to the normal substate in any one of the above-stated manners in order to transmit the data, judging that the power level arbitration is completed (Steps 322, 324 and 326). In FIG. 16, the power level arbitration is performed because there is data to transmit. Therefore, the base station makes a direct transition to the active state (Steps 328 and 330).

In the meantime, when there is data to transmit/receive in the slotted substate, the base station transmits the power control bit (Steps 312 and 314). After transmission of the power control bit, the base station determines whether a power control bit is received from the mobile station (Step 316). Upon failure to receive the power control bit from the mobile station, the base station increases the transmission power to transmit the power control bit with the increased transmission power, judging that the mobile station has not received the power control bit transmitted from the base station (Step 318). However, upon receipt of the power control bit from the mobile station, the base station controls the transmission power according to the received power control bit from the mobile station and transmits the power control bit with the controlled transmission power (Step 320). Thereafter, the base station determines whether the mobile station has changed the transmission power according to the power control bit transmitted from the base station (Step 322). If there is no variation in the transmission power of the mobile station, the base station increases again the transmission power to transmit the power control bit with the increased transmission power (Steps 322 and 318). Upon detecting a variation in the transmission power of the mobile station, the base station makes a transition to the normal substate in any one of the above-stated manners in order to transmit the data, judging that the power level arbitration is completed (Steps 322, 324 and 326). In FIG. 16, the power level arbitration is performed because there is data to transmit. Therefore, the base station makes a direct transition to the active state (Steps 328 and 330).

(IIb) Mobile Station Initiator an Unscheduled PLA

Referring to FIG. 17, in the normal substate, the mobile station monitors whether there is data to transmit (Steps 400 and 402). When there is data to transmit, a transition to the active state occurs to transmit the data (Step 404). However, when there is no data to transmit, the mobile station waits a predetermined time (Step 406). Here, the predetermined time is a maximum holding time of the normal substate. When the predetermine time has not elapsed, the normal substate is maintained, and otherwise, a transition to the slotted substate takes place (Step 408). In the slotted substate, the mobile station determines whether there is data to transmit/receive (Step 412). The case that there is data to transmit/receive corresponds to the case where the mobile station requests the power level arbitration.

If there is no data to transmit/receive in the slotted substate (Step 410), the mobile station determines whether the base station has transmitted a power control bit (Steps 412 and 413). If it is judged that the base station has not transmitted the power control bit, the mobile station maintains the slotted substate. To determine whether the base station has transmitted the power control bit, the mobile station compares a transmission power of the base station with a threshold power, $P_B$, of the base station. If it is judged that the base station has transmitted the power control bit, the mobile station controls the transmission power according to the power control bit transmitted from the base station and transmits the power control bit with the adjusted transmission power (Steps 413 and 420). After transmission of the power control bit, the mobile station determines whether the base station has changed the transmission power according to the power control bit transmitted from the mobile station (Step 422). If there is no variation in the transmission power of the base station, the mobile station increases again the transmission power to transmit the power control bit with the increased transmission power (Steps 422 and 418). Upon detecting variation in the transmission power of the base station, the mobile station makes a transition to the normal substate in any one of the above-stated manners in order to transmit the data, judging that the power level arbitration is completed (Steps 422, 424 and 426). In FIG. 16, the power level arbitration is performed because there is data to transmit. Therefore, the mobile station makes a direct transition to the active state (Steps 428 and 430).

In the meantime, when there is data to transmit/receive in the slotted substate, the mobile station transmits the power control bit (Steps 412 and 414). After transmission of the power control bit, the mobile station determines whether a power control bit is received from the base station (Step 416). Upon failure to receive the power control bit from the base station, the mobile station increases the transmission power to transmit the power control bit with the increased transmission power, judging that the base station has not received the power control bit transmitted from the mobile station (Step 418). However, upon receipt of the power control bit from the base station, the mobile station adjust the transmission power according to the received power control bit from the base station which transmits the power control bit (Step 420). Thereafter, the mobile station determines whether the base station has changed the transmission power according to the power control bit transmitted from the mobile station (Step 422). If there is no variation in the transmission power of the base station, the mobile station increases again the transmission power to transmit the power control bit with the increased transmission power (Steps 422 and 418). Upon detecting variation in the transmission power of the base station, the mobile station makes a transition to the normal substate in any one of the above-stated manners in order to transmit the data, judging that the power level arbitration is completed (Steps 422, 424 and 426). In FIG. 17, the power level arbitration is performed because there is data to transmit. Therefore, the mobile station makes a direct transition to the active state (Steps 428 and 430).

In the light of the foregoing, the novel CDMA mobile communication system can make a quick transition from the control hold state to the active sate, when there is data to transmit.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling transmission power of radio links between a base station and a mobile station in a mobile communication system, the method comprising the steps of:

(a) assigning one or more forward and reverse discontinuous transmission channels between the base station and the mobile station, and controlling the transmission power of the forward and reverse discontinuous transmission channels so that the base station and mobile station can receive data;

(b) discontinuing the control of transmission power, when there is no data to be transmitted for a first predetermined time; and (c) re-controlling the transmission power of the forward and reverse discontinuous transmission channels, during a state defined by step (b), by adjusting the transmission power of the base station and mobile station so that data can be transmitted.

2. The method as claimed in claim 1, wherein the discontinuous transmission channel is a dedicated control channel.

3. The method as claimed in claim 1, wherein said control of transmission power is performed by using a forward power control bit and a reverse power control bit.

4. The method as claimed in claim 1, wherein said control of transmission power is performed by using a forward power control bit, a reverse power control bit, and a reverse pilot signal.

5. The method as claimed in claim 1, wherein said control of transmission power is performed by using a forward pilot signal, a reverse power control bit, and a reverse pilot signal.

6. The method as claimed in claim 1, wherein step (c) is discontinued whenever data is not transmitted for a second predetermined time.

7. The method as claimed in claim 1, wherein the first predetermined time is equal to the second predetermined time.

8. The method as claimed in claim 1, wherein step (c) is performed when data to be transmitted is generated by one of the base station and the mobile station.

9. The method as claimed in claim 6, wherein step (c) is performed at a time scheduled between the base station and the mobile station and is discontinued when no data is transmitted for the second predetermined time.

10. The method as claimed in claim 3, wherein an initial transmission power of the mobile station for transmitting the power control bit is set low enough to not affect the system, at step (c).

11. The method as claimed in claim 10, wherein an initial transmission power of the mobile station is defined as:

Initial Transmission Power of Mobile Station=(First Constant)−(Total Receiving Power), wherein said first constant is an experimentally derived value.

12. The method as claimed in claim 5, wherein an initial transmission power of the mobile station is defined as:

Initial Transmission Power of Mobile Station=(Second Constant)−(Receiving Power of Pilot Signal from Connected Base Station), wherein said second constant is an experimentally derived value.

13. The method as claimed in claim 1, wherein an initial transmission power of the base station is set to a maximum transmission power of the base station, in step (c).

14. The method as claimed in claim 1, wherein an initial transmission power of the base station is determined according to a power level of a pilot channel signal transmitted from the base station.

15. The method as claimed in claim 2, wherein a transition to a slotted substate occurs when data to be transmitted is not generated for a predetermined time, while the forward and reverse dedicated channels are in a normal substate.

16. The method as claimed in claim 1, wherein the step (c) further comprises the steps of:

(i) transmitting a signal from the base station to the mobile station through the forward dedicated control channel, said signal being known to both the base station and the mobile station; and (ii) upon receipt of the signal by the mobile station, transmitting a power control bit for said signal to the base station through the reverse dedicated control channel.

17. The method as claimed in claim 1, wherein step (c) further comprises the steps of:

(i) transmitting a signal from the mobile station to the base station through the reverse dedicated control channel, said signal being known to both the base station and the mobile station; and (ii) upon receipt of the signal by the base station, transmitting a power control bit for said signal to the mobile station through the forward dedicated control channel.

18. A method for transitioning from a non-transmittable signal state to a signal transmittable state in a mobile communication system, the method comprising the steps of:

(1) transitioning to a slotted substate from a normal substate, when there is no data transmitted in a normal substate for a predetermined time;

(2) transmitting via a forward dedicated control channel a power control bit for a reverse dedicated control channel;

(3) transmitting via a reverse pilot channel a power control bit for a forward dedicated control channel;

(4) performing a power level arbitration process when data to be transmitted is generated in the slotted substate;

(5) upon completion of power level arbitration, transitioning to the normal substate by exchanging a state transition message and an acknowledge signal; and (6) establishing a dedicated packet channel in the normal substate to transmit the data.

19. A power level arbitration method for a mobile station in a mobile communication system, comprising the steps of:

transmitting data while performing normal power control through a. discontinuous transmission channel;

discontinuing performing the normal power control and maintaining a radio resource of the discontinuous transmission channel, when data to be transmitted is not generated by the mobile station for a predetermined time; and performing the normal power control when data to be transmitted is generated after a lapse of the predetermined time.

20. A power level arbitration method for a base station in a mobile communication system, comprising the steps of:

transmitting data from the base station while performing a normal power control through a discontinuous transmission channel;

discontinuing performing the normal power control and maintaining a radio resource of the discontinuous transmission channel, when data to be transmitted is not generated by the base station for a predetermined time; and performing the normal power control when data to be transmitted is generated after a lapse of the predetermined time.

* * * * *